US012701083B2

(12) United States Patent
Nguyen et al.

(10) Patent No.: US 12,701,083 B2
(45) Date of Patent: Aug. 4, 2026

(54) PRIORITIZATION OF NETWORK CONNECTIONS THROUGH ADVANCED TRAFFIC CATEGORIZATION

(71) Applicant: Samsung Electronics Co., Ltd., Suwon-si (KR)

(72) Inventors: Khuong N. Nguyen, Frisco, TX (US); Yuming Zhu, Plano, TX (US); Hao Chen, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/771,799

(22) Filed: Jul. 12, 2024

(65) Prior Publication Data

US 2025/0047611 A1 Feb. 6, 2025

Related U.S. Application Data

(60) Provisional application No. 63/530,815, filed on Aug. 4, 2023.

(51) Int. Cl.
*H04L 47/2441* (2022.01)
*H04L 47/2408* (2022.01)
(Continued)

(52) U.S. Cl.
CPC ...... *H04L 47/2441* (2013.01); *H04L 47/2408* (2013.01); *H04L 47/2416* (2013.01); *H04L 47/2425* (2013.01)

(58) Field of Classification Search
CPC ............. H04L 47/2441; H04L 47/2408; H04L 47/2416; H04L 47/2425
See application file for complete search history.

(56) References Cited

U.S. PATENT DOCUMENTS

| | | | |
|---|---|---|---|
| 8,189,471 B2 | 5/2012 | Wu et al. | |
| 8,792,339 B2 | 7/2014 | Evans | |

(Continued)

FOREIGN PATENT DOCUMENTS

| | | |
|---|---|---|
| CN | 109981779 B | 2/2022 |
| CN | 112260950 B | 5/2022 |

(Continued)

OTHER PUBLICATIONS

International Search Report for PCT/KR2024/011299 by Korean Intellectual Property Office dated Nov. 1, 2024.

(Continued)

*Primary Examiner* — Suraj M Joshi

(57) ABSTRACT

An embodiment includes a network connected device comprising a transceiver configured to receive network traffic from the network, a memory coupled to the transceiver, a processor coupled to the memory and the transceiver, the processor configured to: decompose the network traffic into a plurality of data flows based on source information and destination information, store the plurality of data flows in a traffic map, each entry of the traffic map includes a data flow identification and traffic information of the data flow in an observation time window, determine a service type for each of the data flows using machine learning; and prioritize a first data flow over a second data flow in the plurality of data flows based on the service type.

20 Claims, 25 Drawing Sheets

2500

| | |
|---|---|
| Receive traffic data | —2501 |
| Decompose traffic data | —2503 |
| Process input data | —2505 |
| Detect service type | —2507 |
| Post-process | —2509 |
| Output prediction | —2511 |
| Prioritize traffic | —2513 |

(51) Int. Cl.
    *H04L 47/2416*       (2022.01)
    *H04L 47/2425*       (2022.01)

(56)             References Cited

U.S. PATENT DOCUMENTS

| | | | |
|---|---|---|---|
| 9,935,871 B2 | 4/2018 | Bastian et al. | |
| 11,599,588 B1 * | 3/2023 | Tang | G06F 16/55 |
| 2002/0089989 A1 | 7/2002 | Christensen et al. | |
| 2018/0034736 A1 * | 2/2018 | Anchan | H04L 47/2433 |
| 2019/0394527 A1 | 12/2019 | Chandrasekhar | |
| 2021/0306910 A1 | 9/2021 | Guo et al. | |
| 2022/0369153 A1 | 11/2022 | Manja Ppallan | |
| 2023/0216760 A1 | 7/2023 | Nguyen | |
| 2023/0396555 A1 * | 12/2023 | Kasichainula | H04L 47/6275 |

FOREIGN PATENT DOCUMENTS

| | | | |
|---|---|---|---|
| CN | 117202256 A | 12/2023 | |
| JP | 2023-517143 A | 4/2023 | |
| KR | 10-2018-0115093 A | 10/2018 | |
| WO | 2006/109006 A1 | 10/2006 | |

OTHER PUBLICATIONS

Supplementary European Search Report dated Mar. 24, 2026, in connection with European Application No. EP24852195, 10 pages.

* cited by examiner

Figure 6:
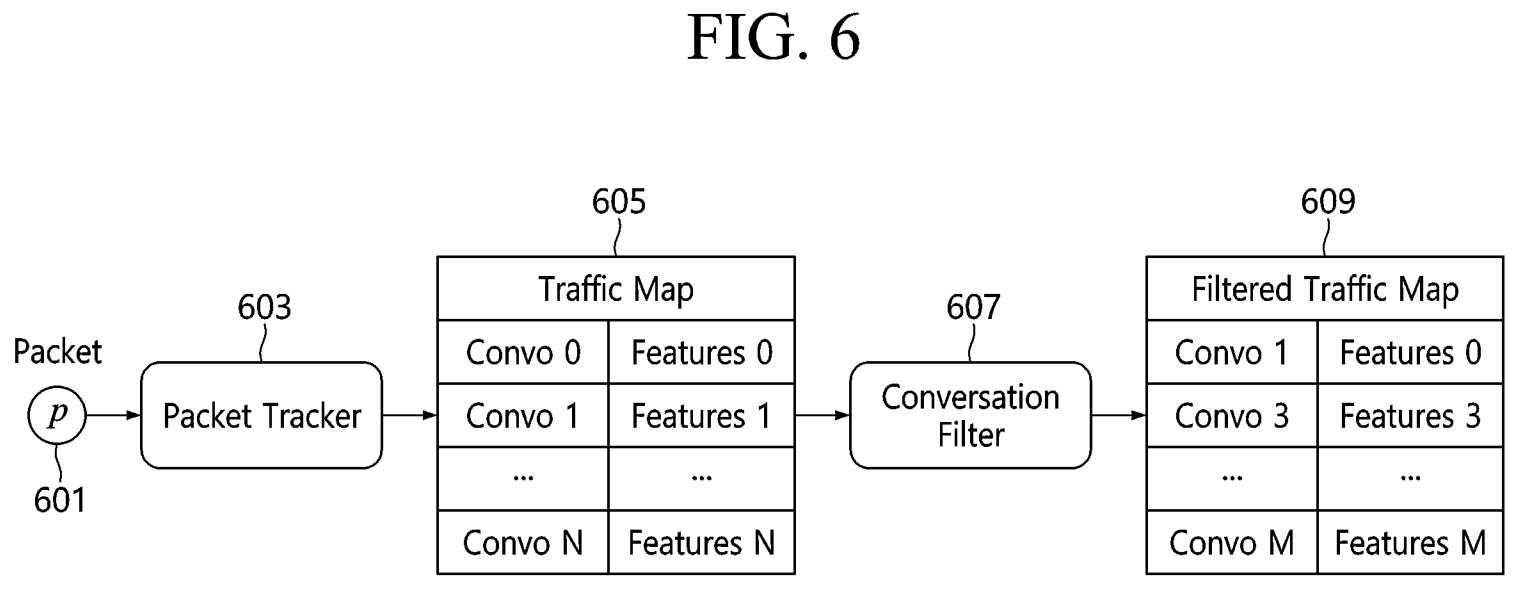

| Traffic Map | |
|---|---|
| Convo 0 | Features 0 |
| Convo 1 | Features 1 |
| ... | ... |
| Convo N | Features N |

605

603 Packet Tracker

601 Packet *p*

607 Conversation Filter

| Filtered Traffic Map | |
|---|---|
| Convo 1 | Features 0 |
| Convo 3 | Features 3 |
| ... | ... |
| Convo M | Features M |

| Traffic Map | |
|---|---|
| Convo A | 40 pkts |
| Convo J | 100 pkts |
| Convo M | 5 pkts |
| Convo F | 150 pkts |
| Convo D | 10 pkts |

Sort →

703

| Sorted Traffic Map | |
|---|---|
| Convo F | 150 pkts |
| Convo J | 100 pkts |
| Convo A | 40 pkts |
| Convo D | 10 pkts |
| Convo M | 5 pkts |

Get top $k = 3$ conversations →

705

| Top $K$ Traffic Map | |
|---|---|
| Convo F | 150 pkts |
| Convo J | 100 pkts |
| Convo A | 40 pkts |

| Traffic Map | |
|---|---|
| Convo A | 40 pkts |
| Convo J | 100 pkts |
| Convo M | 5 pkts |
| Convo F | 150 pkts |
| Convo D | 10 pkts |

Filter out conversations with pkts ≤ 15

803

| Filtered Traffic Map | |
|---|---|
| Convo F | 150 pkts |
| Convo J | 100 pkts |
| Convo A | 40 pkts |

| Traffic Map | |
|---|---|
| Convo A | 40 pkts |
| Convo J | 100 pkts |
| Convo M | 5 pkts |
| Convo F | 150 pkts |
| Convo D | 10 pkts |

Filter out conversations with thres ≤ 50kb

903

| Filtered Traffic Map | |
|---|---|
| Convo F | 150 pkts |
| Convo J | 100 pkts |

FIG. 10

Event Relative Time

FIG. 11

Most recently used convo address will be at the head

Least recently used

Put()

Get()

| Tail | Convo F | Convo A | Convo N | Head |

Pop()

• Least recently used convo will be at the tail and will be evicted if the capacity of the cache is reached and new IP address is being inserted into the cache.

Event Relative Time

FIG. 14

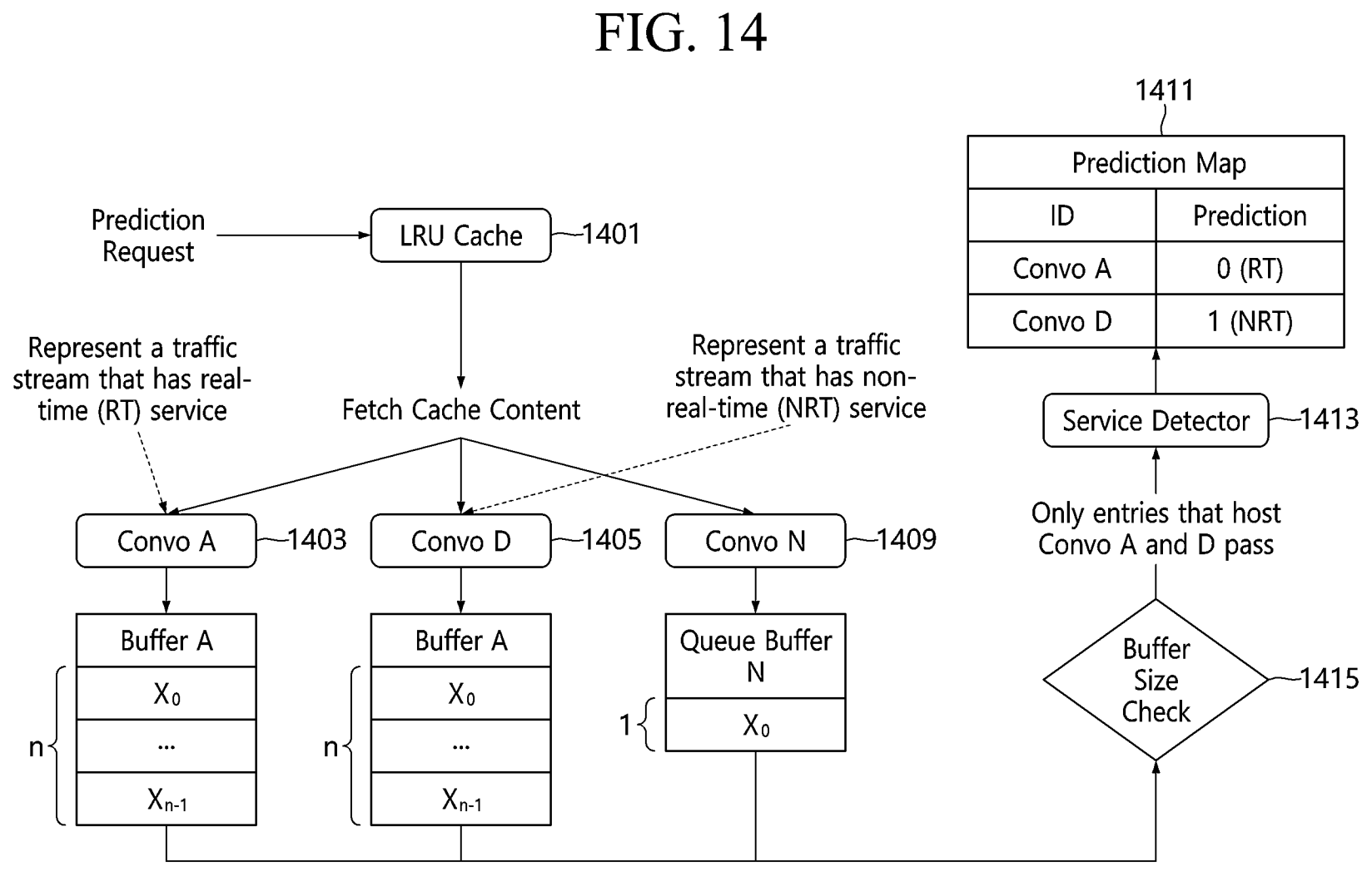

Prediction Map — 1411

| ID | Prediction |
|---|---|
| Convo A | 0 (RT) |
| Convo D | 1 (NRT) |

Service Detector — 1413

Only entries that host Convo A and D pass

Buffer Size Check — 1415

Prediction Request

LRU Cache — 1401

Fetch Cache Content

Represent a traffic stream that has non-real-time (NRT) service

Represent a traffic stream that has real-time (RT) service

Convo A — 1403

Convo D — 1405

Convo N — 1409

Buffer A

| $X_0$ | ... | $X_{n-1}$ |
|---|---|---| n

Buffer A

| $X_0$ | ... | $X_{n-1}$ |
|---|---|---| n

Queue Buffer N

| $X_0$ |
|---|

Weighted Voting Scheme $vp_t = 1$ $vp_{t-1} = 1-\alpha *$ $vp_{t-2} = 1-\alpha * 2$ $vp_{t-(n+1)} = 1-\alpha * n$ $\boxtimes$ $\boxtimes$ $\boxtimes$ $\boxtimes$ $p_t$ $p_{t-1}$ $p_{t-2}$ $\cdots$ $p_{t-(n+1)}$

| Receive traffic data | —2501 |

| Decompose traffic data | —2503 |

| Process input data | —2505 |

| Detect service type | —2507 |

| Post-process | —2509 |

| Output prediction | —2511 |

| Prioritize traffic | —2513 |

PRIORITIZATION OF NETWORK CONNECTIONS THROUGH ADVANCED TRAFFIC CATEGORIZATION

CROSS-REFERENCE TO RELATED APPLICATIONS

This application claims the benefit of priority from U.S. Provisional Application No. 63/530,815, entitled "Prioritization of Network Connections Through Advanced Traffic Categorization Techniques" filed Aug. 4, 2023, which is incorporated herein by reference in its entirety.

TECHNICAL FIELD

This disclosure relates generally to a wireless communication system, and more particularly to, for example, but not limited to, prioritization of network connections through advanced traffic categorization techniques.

BACKGROUND

Network technologies, including wireless technology, have evolved toward increasing data rates and service types, and continue their growth in various markets such as home, enterprise and hotspots over the years. The service types include voice, data and video. There has been a growing need for identifying the types of services presented in a network traffic stream.

The description set forth in the background section should not be assumed to be prior art merely because it is set forth in the background section. The background section may describe aspects or embodiments of the present disclosure.

SUMMARY

One aspect of the present disclosure provides a network connected device comprising a transceiver configured to receive network traffic from the network, a memory coupled to the transceiver, a processor coupled to the memory and the transceiver. The processor is configured to decompose the network traffic into a plurality of data flows based on source information and destination information. The processor is configured to store the plurality of data flows in a traffic map, each entry of the traffic map includes a data flow identification and traffic information of the data flow in an observation time window. The processor is configured to determine a service type for each of the data flows using machine learning. The processor is configured to prioritize a first data flow over a second data flow in the plurality of data flows based on the service type.

In some embodiments, the first data flow is a real-time (RT) data flow and the second data flow is a non-RT (NRT) data flow.

In some embodiments, the processor is further configured to, during a different observation time window, determine that prioritization is not needed based on determining that all data flows in the plurality of data flows have a same service type.

In some embodiments, the processor is further configured to determine quality of service requirements of the plurality of data flows to prioritize the plurality of data flows.

In some embodiments, the processor is further configured to determine latency requirements of the plurality of data flows to prioritize the plurality of data flows.

In some embodiments, the processor is further configured to determine application types associated with the plurality of data flows to prioritize the plurality of data flows.

In some embodiments, the processor is further configured to reserve an amount of bandwidth for the first data flow.

In some embodiments, the source information is a source Internet Protocol (IP) address or a source port, and the destination information is a destination IP address or a destination port.

In some embodiments, the processor is configured to filter the stored data flows based on a number of packets or a number of bytes in each of the stored data flows.

In some embodiments, the processor is configured to use a multi-layer machine learning model having a first layer and a second layer, wherein the first layer of the multi-layer machine learning model determines the service type and the second layer of the multi-layer machine learning model further divides the service type into sub-categories.

One aspect of the present disclosure provides a method for detecting network service types. The method comprises receiving network traffic from a transceiver. The method comprises decomposing the network traffic into a plurality of data flows based on source information and destination information. The method comprises storing the plurality of data flows in a traffic map in a memory, each entry of the traffic map includes a data flow identification and traffic information of the data flow in an observation time window. The method comprises determining a service type for each of the data flows using machine learning. The method comprises prioritizing a first data flow over a second data flow in the plurality of data flows based on the service type.

In some embodiments, the first data flow is a real-time (RT) data flow and the second data flow is a non-RT (NRT) data flow.

In some embodiments, the method further comprises, during a different observation time window, determining that prioritization is not needed based on determining that all data flows in the plurality of data flows have a same service type.

In some embodiments, the method further comprises determining quality of service requirements of the plurality of data flows to prioritize the plurality of data flows.

In some embodiments, the method further comprises determining latency requirements of the plurality of data flows to prioritize the plurality of data flows.

In some embodiments, the method further comprises determining application types associated with the plurality of data flows to prioritize the plurality of data flows.

In some embodiments, the method further comprises reserving an amount of bandwidth for the first data flow.

In some embodiments, the source information is a source Internet Protocol (IP) address or a source port, and the destination information is a destination IP address or a destination port.

In some embodiments, the method further comprises filtering the stored data flows based on a number of packets or a number of bytes in each of the stored data flows.

In some embodiments, the method further comprises using a multi-layer machine learning model having a first layer and a second layer, wherein the first layer of the multi-layer machine learning model determines the service type and the second layer of the multi-layer machine learning model further divides the service type into sub-categories.

BRIEF DESCRIPTION OF THE DRAWINGS

FIG. 1 shows an example of a wireless network in accordance with an embodiment.

FIG. 6 illustrates a traffic decomposition process in accordance with an embodiment.

FIG. 7 illustrates filtering conversations to a top k conversations using packet count as the criteria in accordance with an embodiment.

FIG. 8 illustrates filtering conversations with a threshold using packet count as a criteria in accordance with an embodiment.

FIG. 9 illustrates filtering conversations with a threshold using load size as the criteria in accordance with an embodiment.

FIG. 10 illustrates filtering conversations with a threshold using load size as the criteria in accordance with an embodiment.

FIG. 11 illustrates a cache manager and a least recently used (LRU) cache in accordance with an embodiment.

FIG. 13 illustrates a process of forming a final input for a service detector module in accordance with an embodiment.

FIG. 14 illustrates operation of a service detector in accordance with an embodiment.

FIG. 19 illustrates a post processor implemented using a majority voting scheme in accordance with an embodiment.

FIG. 20 illustrates a post processor implemented using a weighted voting scheme in accordance with an embodiment.

FIG. 22 illustrates a data flow of a network service detector in accordance with an embodiment.

FIG. 23 illustrates a flow diagram of a prioritization module in accordance with an embodiment.

FIG. 24 illustrates a flow of a data collection process in accordance with an embodiment.

Figure 2:
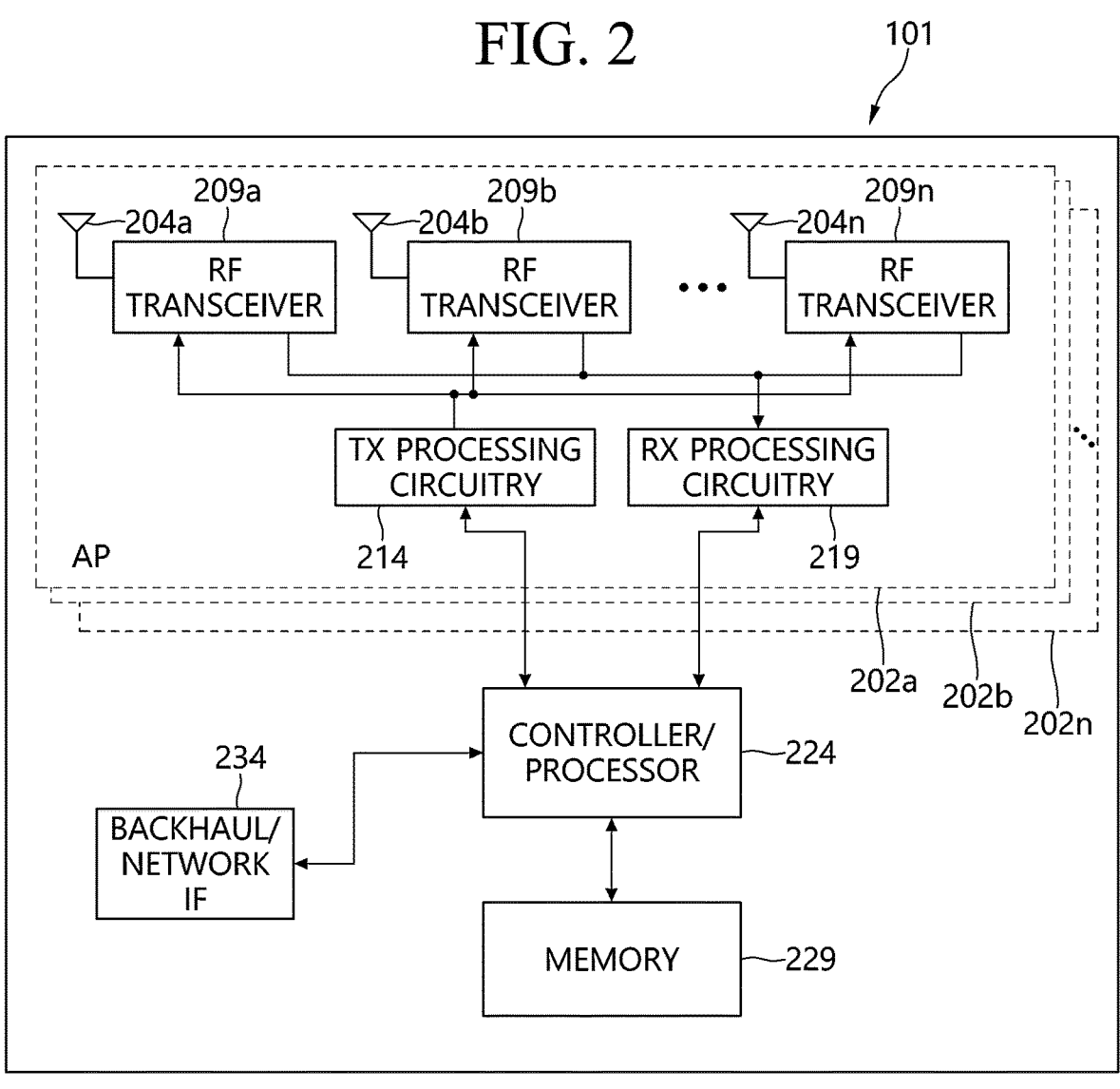
FIG. 2 shows an example of an AP in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The present disclosure relates to communication systems, including, but not limited to, wireless communication systems, for example, to a Wireless Local Area Network (WLAN) technology. WLAN allows devices to access the internet in the 2.4 GHz, 5 GHZ, 6 GHz or 60 GHZ frequency bands. WLANs are based on the Institute of Electrical and Electronic Engineers (IEEE) 802.11 standards. IEEE 802.11 family of standards aim to increase speed and reliability and to extend the operating range of wireless networks.

Although examples and descriptions below may depict wireless communication systems, the present disclosure is applicable to both wired and wireless technologies. As such, references to wireless devices, systems and processes may be similarly applicable to wired counterparts.

The following description is directed to certain implementations for the purpose of describing the innovative aspects of this disclosure. However, a person having ordinary skill in the art will readily recognize that the teachings herein may be applied in a multitude of different ways. The described embodiments may be implemented in any device, system or network that is capable of transmitting and receiving signals, for example, radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

The demand for data traffic continues to grow. For example, the demand for wireless data traffic is rapidly increasing due to the growing popularity among consumers and businesses of smart phones and other mobile data devices, such as tablets, "note pad" computers, net books, eBook readers, and machine type of devices. With this growth there is thus the desire to identify the type of services presented in a network traffic stream. Being able to detect the service type of traffic flows may be essential to a wide range of applications, for example, traffic prioritization, controlling 802.11ax Target Wake Time function, dynamic scheduling, quality of service ensuring, abnormality detection, etc. Early approaches relying on DPI (Deep Packet Inspection) and packet port numbers have become less feasible since modern network traffic is often encrypted. This has necessitated the desire to segregate the traffic based on, for example, the conversations between endpoints, then extract features from the packet information and map the traffic pattern to the correct service categories using machine learning algorithms.

Generally, the present disclosure may enable reliable methods and systems to identify multiple types of services when presented in a traffic stream. A network traffic stream sometimes can contain not just one type of service but multiple types. For example, given a scenario where a user interacts with his/her mobile device, he/she can simultaneously be downloading a large file and making an internet phone call. In this scenario, the network stream contains two types of services. When there is a need to identify these service types, current approaches cannot identify multiple service types in a traffic stream. The present disclosure supports the detection of multiple services.

Being able to do this may also enable more applications and/or functionalities such as service prioritization, traffic throttling and power management. The ability to automatically analyze the network traffic to identify the services may be highly valuable for a wide range of functionalities including network resource management, quality of service, dynamic access control, power saving, and others. These abilities in turn facilitate efficient communication and reliable data transportation which may open the doors for even further technologies to be developed.

Figure 1:
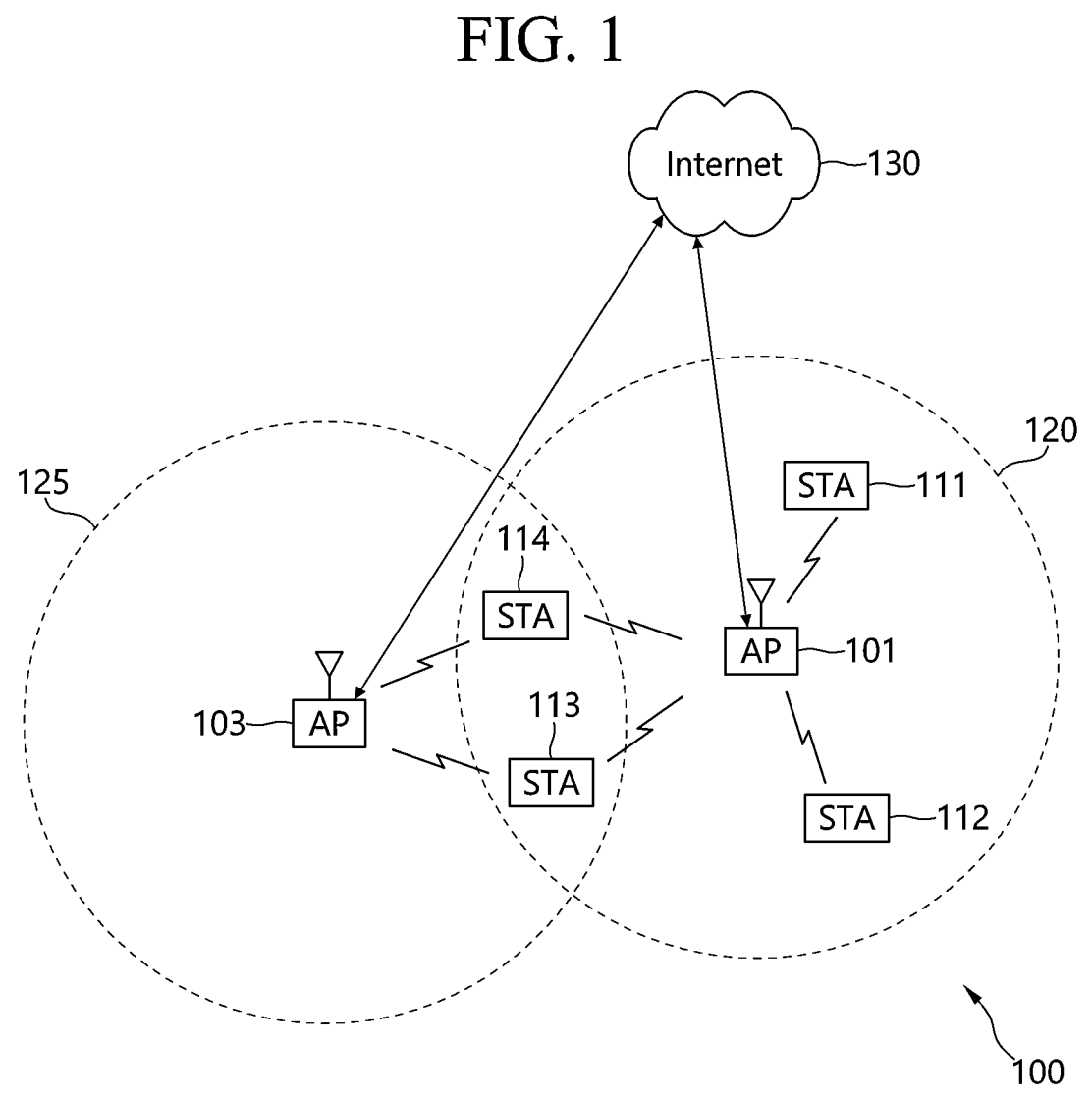

FIG. 1 shows an example of a wireless network 100, in accordance with some embodiments, in which the present disclosure may operate. The embodiment of the wireless network 100 shown in FIG. 1 is for illustrative purposes only. Other embodiments of the wireless network 100 may be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 may communicate with at least one network 130, such as the Internet, a proprietary Internet Protocol (IP) network, or other data network. The AP 101 provides wireless access to the network 130 for a plurality of stations (STAs) 111-114 with a coverage area 120 of the AP 101. The APs 101 and 103 may communicate with each other and with the STAs using Wi-Fi or other WLAN communication techniques.

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 may include any number of APs and any number of STAs in any suitable arrangement. Also, the AP 101 may communicate directly with any number of STAs and provide those STAs with wireless broadband access to the network 130. Similarly, each AP 101 and 103 may communicate directly with the network 130 and provides STAs with direct wireless broadband access to the network 130. Further, the APs 101 and/or 103 may provide access to other or additional external networks, such as external telephone networks or other types of data networks.

FIG. 2 shows an example of an AP 101 in accordance with some embodiments. The embodiment of the AP 101 shown in FIG. 2 is for illustrative purposes, and the AP 103 of FIG. 1 may have the same or similar configuration. However, APs come in a wide range of configurations, and FIG. 2 does not limit the scope of this disclosure to any particular implementation of an AP.

As shown in FIG. 2, the AP 101 may include multiple antennas 204a-204n, multiple radio frequency (RF) transceivers 209a-209n, transmit (TX) processing circuitry 214, and receive (RX) processing circuitry 219. The AP 101 may also include a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 may include one or more processors or other processing devices that control the overall operation of the AP 101. For example, the controller/processor 224 may control the reception of uplink signals and the transmission of downlink signals by the RF transceivers 209a-209n, the RX processing circuitry 219, and the TX processing circuitry 214 in accordance with well-known principles. The controller/processor 224 may support additional functions as well, such as more advanced wireless communication functions. For instance, the controller/processor 224 may support beam forming or directional routing operations in which outgoing signals from multiple antennas 204a-204n are weighted differently to effectively steer the outgoing signals in a desired direction. The controller/processor 224 may also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 may also be capable of executing programs and other processes resident in the memory 229, such as an OS. The controller/processor 224 may move data into or out of the memory 229 as required by an executing process.

The controller/processor 224 may also be coupled to the backhaul or network interface 234. The backhaul or network interface 234 may allow the AP 101 to communicate with other devices or systems over a backhaul connection or over a network. The interface 234 may support communications over any suitable wired or wireless connection(s). For example, the interface 234 may allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 may be coupled to the controller/processor 224. Part of the memory 229 may include a RAM, and another part of the memory 229 may include a Flash memory or other ROM.

As described in more detail below, the AP 101 may include circuitry and/or programming for management of channel sounding procedures in WLANs. Although FIG. 2 illustrates one example of AP 101, various changes may be made to FIG. 2. For example, the AP 101 may include any number of each component shown in FIG. 2. As a particular example, an AP may include a number of interfaces 234, and the controller/processor 224 may support routing functions to route data between different network addresses. As another example, while shown as including a single instance of TX processing circuitry 214 and a single instance of RX processing circuitry 219, the AP 101 may include multiple instances of each (such as one per RF transceiver). Alternatively, only one antenna and RF transceiver path may be included, such as in legacy APs. Also, various components in FIG. 2 may be combined, further subdivided, or omitted and additional components may be added according to particular needs.

As shown in FIG. 2, in some embodiments, the AP 101 may be an AP MLD that includes multiple APs 202a-202n. Each AP 202a-202n is affiliated with the AP MLD 101 and may include multiple antennas 204a-204n, multiple radio frequency (RF) transceivers 209a-209n, transmit (TX) processing circuitry 214, and receive (RX) processing circuitry

219. Each APs 202a-202n may independently communicate with the controller/processor 224 and other components of the AP MLD 101. FIG. 2 shows that each AP 202a-202n has separate multiple antennas, but each AP 202a-202n may share multiple antennas 204a-204n without needing separate multiple antennas. Each AP 202a-202n may represent a physical (PHY) layer and a lower media access control (MAC) layer.

Figure 3:
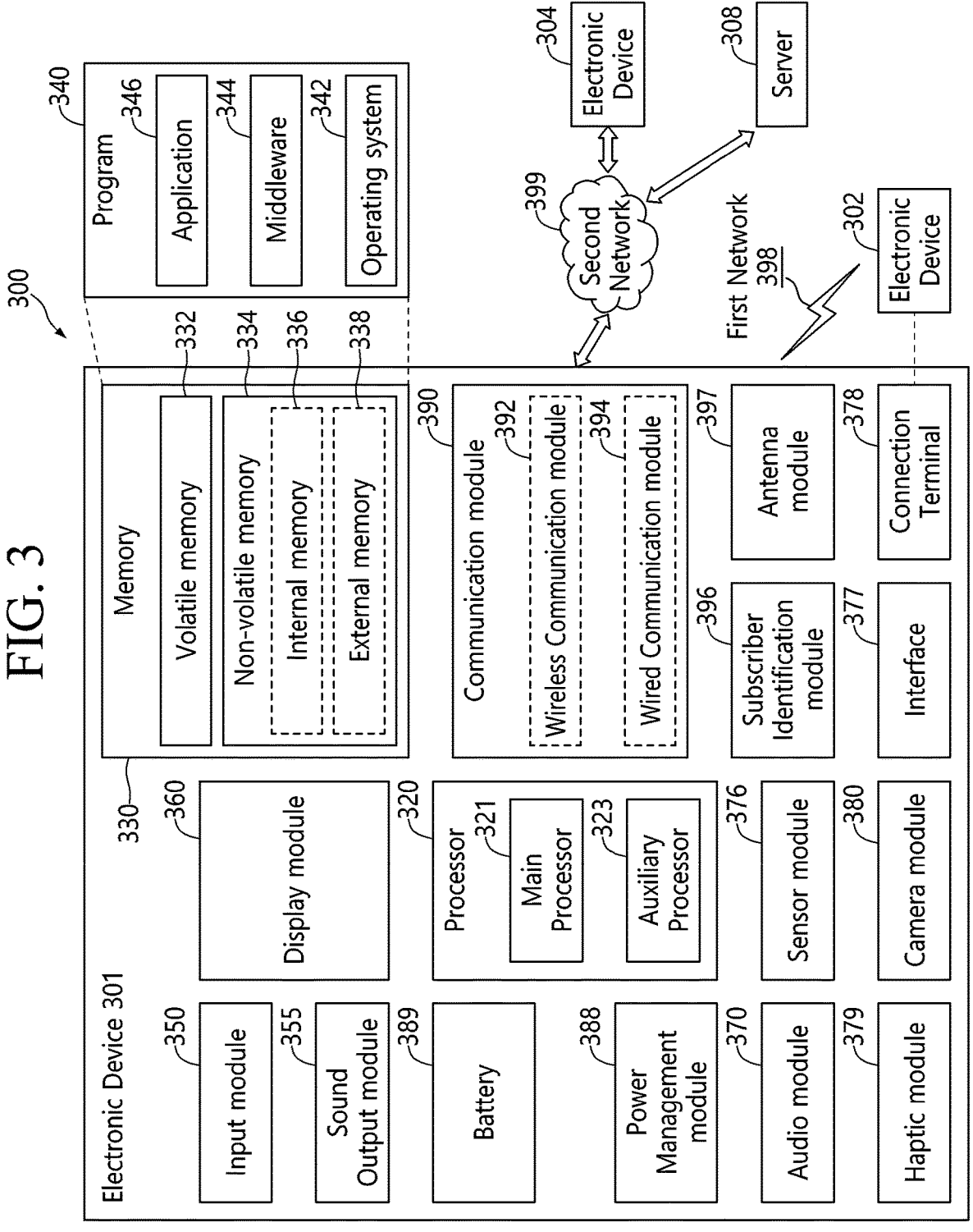
FIG. 3 shows an example of a STA in accordance with an embodiment.

FIG. 3 shows an example of a STA 111 in accordance with some embodiments. The embodiment of the STA 111 shown in FIG. 3 is for illustrative purposes, and the STAs 111-114 of FIG. 1 may have the same or similar configuration. However, STAs come in a wide variety of configurations, and FIG. 3 does not limit the scope of this disclosure to any particular implementation of a STA.

In the example of FIG. 3, the STA may be an electronic device 301, for example, a mobile device (such as a mobile telephone, a smartphone, etc.) or a stationary device (such as a desktop computer, AP, or a media player, etc.).

As shown in FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 or the second network 399 may be, for example, a wireless local area network (WLAN) conforming IEEE 802.11be standard or any future amendments to IEEE 802.11 standard.

According to some embodiments, the electronic device 301 may communicate with the electronic device 304 via the server 308. According to some embodiments, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 30, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320 and may perform various data processing or computation. According to some embodiments, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to some embodiments, the processor 320 may include a main processor 321 (e.g., a central processing unit (CPU) or an application processor), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to some embodiments, the auxiliary processor 323 (e.g., an ISP or a CP) may be implemented as part of another component (e.g., the camera module 380 or the communication module 390) functionally related to the auxiliary processor 323. According to some embodiments, the auxiliary processor 323 (e.g., the NPU) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or one or more applications 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing recorded data. The receiver may be used for receiving incoming calls. According to some embodiments, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to some embodiments, the display module 360 may include a touch sensor adapted to detect a touch, or a pressure sensor adapted to measure the intensity of force incurred by the touch.

The audio module 370 may convert a sound into an electrical signal and vice versa. According to some embodiments, the audio module 370 may obtain the sound via the input module 350 or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to some embodiments, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to some embodiments, the interface 377 may include, for example, a high-definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to some embodiments, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to some embodiments, the camera module 380 may include one or more lenses, image sensors, ISPs, or flashes.

The power management module 388 may manage power supplied to the electronic device 301. According to some embodiments, the power management module 388 may be implemented as at least part of, for example, a power management integrated circuit (PMIC).

The battery 389 may supply power to at least one component of the electronic device 301. According to some embodiments, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more CPs that are operable independently from the processor 320 (e.g., the application processor) and supports a direct (e.g., wired) communication or a wireless communication. According to some embodiments, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, Wi-Fi direct, or IR data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the SIM 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (MIMO), full dimensional MIMO (FD-MIMO), array antenna, analog beam-forming, or large-scale antenna. The wireless communication module 392 may support various requirements specified in the electronic device 301, an external electronic device (e.g., the electronic device 304), or a network system (e.g., the second network 399). According to some embodiments, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to some embodiments, the mmWave antenna module may include a PCB, a RFIC disposed on a first surface (e.g., the bottom surface) of the PCB, or adjacent to the first surface and capable of supporting a designated high-frequency band (e.g., the mm Wave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to some embodiments, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to some embodiments, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra-low-latency services using, e.g., distributed computing or MEC. In another embodiment, the external electronic device 304 may include an Internet-of-things (IoT) device. The server 308 may be an intelligent server using machine learning and/or a neural network. According to some embodiments, the external electronic device 304 or the server 308 may be included in the second network 399. The electronic device 301 may be applied to intelligent services (e.g., smart home, smart city, smart car, or healthcare) based on 5G communication technology or IoT-related technology.

As mentioned herein, a network stream may contain multiple types of services. A service (or network service) may be a function provided over a network infrastructure that facilitates application-level interactions and data exchanges, in a network data stream (or network stream), between connected devices. A network stream may include voice, video and data traffic. Generally, at a high-level description, the present disclosure provides a network detection service that may accurately identify different types of services in a network stream. In some embodiments, the network detection service may be implemented in a user device, such as user device 300.

Figure 4:
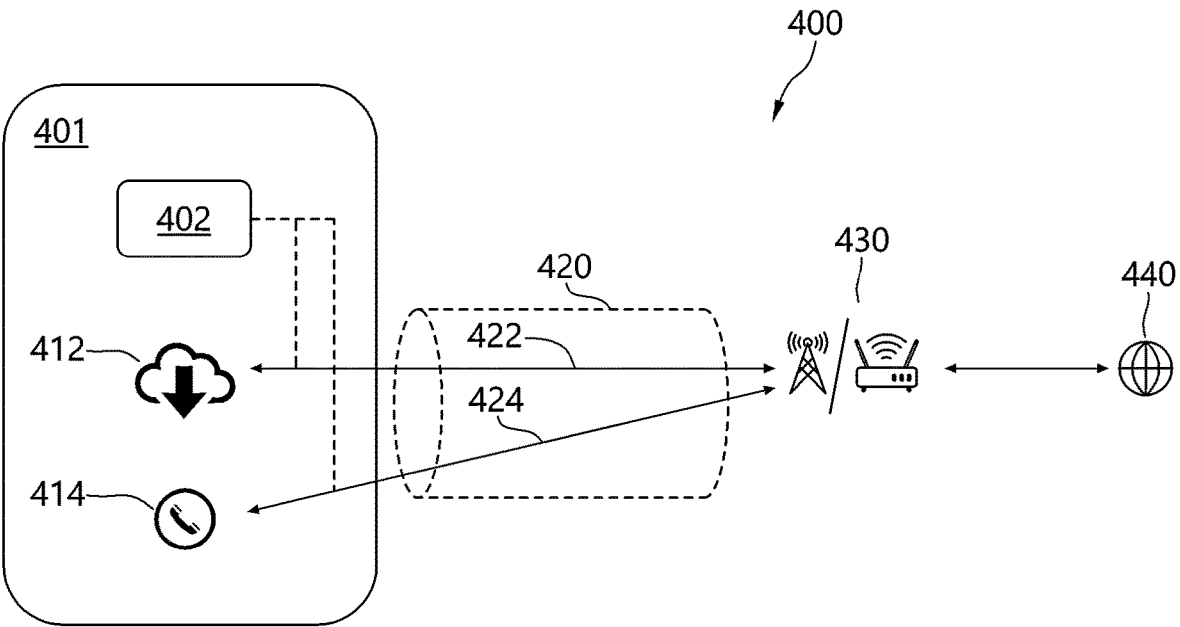
FIG. 4 shows an example of a wireless network in which the present disclosure may operate in accordance with an embodiment.

FIG. 4 shows an example of a wireless network 400, in accordance with some embodiments, in which the present disclosure may operate. The embodiment of the wireless network 400 shown in FIG. 4 is for illustrative purposes only. Other embodiments of the wireless network 400 may be used without departing from the scope of this disclosure. Although the example in FIG. 4 shows a wireless network, the principles of this disclosure may also be implemented in a wired network.

As shown in FIG. 4, the wireless network 400 may include a user device 401 (similar to electronic device 301), which may connect to the Internet 440 through an AP or cellular device 430. In this example, the user device 401 is shown with two running applications 412 and 414. Application 412 may be performing file downloading function, for example, cloud storage file downloading. Application 414 may be a voice call, for example, a Voice-over-IP (VOIP) call. For simplicity, data traffic between the applications 412 and 414 and the upstream network devices are shown in network stream 420. The network stream 420 thus includes both data traffic flow 422 for application 412 and data traffic flow 424 for application 414. Using the data traffic flows 422 and 424, a network detection service 402 may detect or predict the service type of each of the data traffic flows. In this example, the network detection service 402 may predict that the service type on data traffic flow 422 is of non-real-time type, and service type on data traffic flow 424 is of real-time type.

In the expanding domain of shared network environments (e.g., wireless networks, cellular networks, among others), traffic prioritization may be beneficial to address various concerns. As diverse devices and applications vie for limited resources, the challenge of ensuring an optimal user experience may be important. Detecting the network traffic types and the process of identifying and understanding the specific requirements of various connections may play an important role in providing an optimal user experience. By perceiving the distinct needs of individual users and services, a network may be enabled to allocate resources strategically, thus fulfilling high-priority demands and maintaining overall network integrity.

Embodiments in accordance with this disclosure can prioritize the flows of network traffic going through connections shared by a host to clients. In order to prioritize the proper connection(s), some embodiments can provide an ability to identify the traffic type(s). Being able to detect the type(s) of traffic flow may enable connection prioritization. Furthermore, prioritization of traffic may provide a wide range of other benefits including achieving energy efficiency, ensuring quality of service, among others.

Embodiments in accordance with this disclosure may allow the decomposition of a network traffic flow into individual traffic stream(s) based on quintuple rules. Some embodiments may then extract features from the packets of each stream and map the traffic patterns to the correct categories using machine learning-based or heuristic-based methods.

Some embodiments can provide a reliable way to identify the type(s) of traffic presented in a traffic flow. Accordingly, some embodiments may provide traffic prioritization for network connections such as hotspot connections among others. In particular, existing techniques may be ad-hoc and may rely on known port numbers which may not generalize well when it comes to unseen applications. Accordingly, embodiments in accordance with this disclosure may support a more robust detection of the traffic type(s). Embodiments in accordance with this disclosure may provide a sophisticated approach to manage multi-user network environments which may provide various benefits in the field of network management.

Some embodiments may provide for prioritizing network connections established between a host and its client(s). Some embodiments may enable a prioritization of network connections by using the detection of the traffic types going through the connections. Specifically, some embodiments may categorize similar kinds of network traffic into different categories, which may be referred to as network services. Some embodiments may identify the services presented in the traffic flows that are going through those connections. In particular, when a client establishes a connection to a host, the client may have a single link or multiple links to the host, which may depend on the number of applications running on the client.

Figure 5:
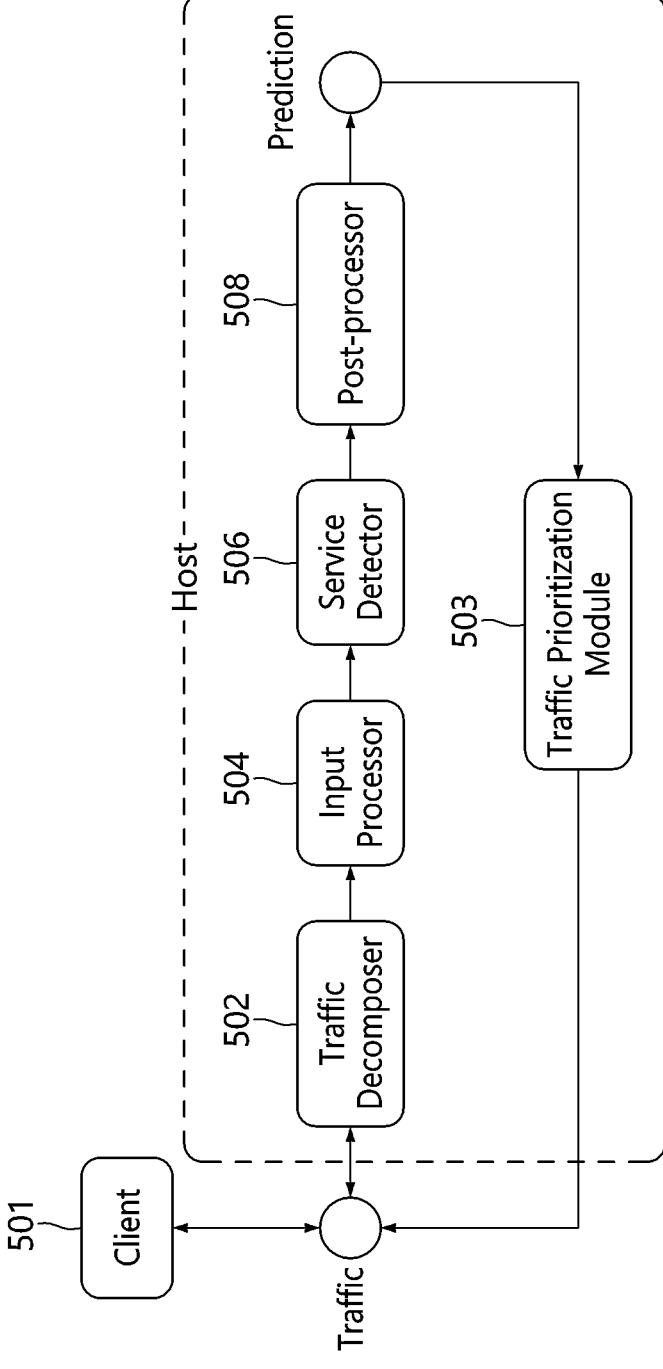
FIG. 5 illustrates a system architecture for prioritizing network traffic in accordance with an embodiment.

FIG. 5 illustrates a system architecture for prioritizing network traffic in accordance with an embodiment. The system 500 may include a traffic decomposer 502, an input processor 504, a service detector 506, a post-processor 508, and a traffic prioritization module 503. As illustrated, a client device 501 may communicate traffic with the system 500. To detect the network service(s) existing in a main traffic flow (e.g., going through a connection), the traffic decomposer 502 may be used to decompose the main traffic flow into multiple traffic streams using quintuple rules (e.g., source and destination addresses, among others). In some embodiments, each traffic stream may be a smaller flow of network packets compared to the main traffic flow. The input processor 504 may be used to compute a set of features using the information retrieved from the packets. The network service detector 506 may use the extracted features to predict the service(s). The post-processor 508 may use the service predictions to decide whether traffic prioritization is needed. If prioritization is needed, then the traffic prioritization module 503 may adjust the configuration parameters and allocate resources for the proper traffic stream(s).

In some embodiments, the input processor 504 may include a data organization management and storage system that may manage and maintain decomposed traffic streams, extract features, and prepare input from the streams for service categorization. In some embodiments, the service detector 506 may use machine learning or heuristic-based techniques to accurately determine the network service type associated with each traffic stream. In some embodiments, the traffic prioritization module 510 may be capable of prioritizing network links between hosts and clients by utilizing various techniques, and may leverage the information provided by the service detector 506. In some embodiments, the traffic decomposer 502 may be used to decompose a traffic flow into smaller individual traffic streams. Specifically, for each established connection between a host and a client, the task of traffic decomposer 502 may be to segment the main traffic flow into components that enable the detection of the service(s).

In some embodiments, the term "conversation" or "convo" may be used to describe the link between an application server and a client, which may be facilitated by a connection between the host and the client. A conversation may be defined by combining the source and destination addresses to create a tuple convo=<$address_A$, $address_B$>. The addresses can be the IP addresses, MAC addresses, and/or the port numbers and/or a combination of the above. For example, the tuple could be convo=<IP $address_{source}$, Port number$_{source}$, IP address$_{destination}$, Port number$_{destination}$>. Accordingly, the quintuple rules may be used to describe the link.

In some embodiments, to decompose the traffic flow, a packet tracker may be used to extract information from the packet's IP header including the source and destination addresses. In some embodiments, a traffic map, which may be implemented using data structures such as a hash map or a dictionary among others, may be used to match the traffic to its corresponding conversation within a time interval. This time interval may be referred to as a burst b or a time step which can be set with any value within a range (e.g. a range of 300 ms to 700 ms). Some embodiments may provide a default value (e.g., a default value of b is 500 ms).

Some embodiments may use a traffic mapping process. In some embodiments, for every predefined burst, the packets' IP headers may be parsed then properly grouped into conversations. For each conversation, the features may be calculated. These features may be obtained based on packet information and/or packet timing information, and can include, but are not limited to the following information. Uplink & downlink maximum inter-arrival time may be the maximum time difference between arrival of one packet and the next packet within a burst (2 values). Uplink & downlink average inter-arrival time may be the average time difference between arrival of one packet and the next packet within a burst (2 values). Uplink & downlink packet counts may be the uplink and downlink number of packets within a burst (2 values). Uplink & downlink minimum packet size may be the uplink and downlink minimum packet size in Mb within a burst (2 values). Uplink & downlink maximum packet size may be the uplink and downlink maximum packet size in Mb within a burst (2 values). Uplink & downlink average packet size may be the uplink and downlink average packet size in Mb within a burst (2 values). Uplink & downlink UDP packet counts may be the uplink and downlink User Datagram Protocol (UDP) number of packets within a burst (2 values). Uplink & downlink TCP packet counts may be the uplink and downlink Transmission Control Protocol (TCP) number of packets within a burst (2 values). In some embodiments, the traffic map may be updated using the key as the conversation and the value as the extracted features.

FIG. 6 illustrates a traffic decomposition process in accordance with an embodiment. As illustrated a packet, p 601, can be provided to a packet tracker 603, which can generate a traffic map 605 The traffic map 605 can include a set of conversations, illustrated as Convo 0 to N, with corresponding Features 0 to N. The traffic map 605 can be provided to a conversation filter 607, which can generate a filtered traffic map 609 that can include a set of conversions and corresponding features, illustrated as Convo 1 to M and corresponding Features 0 to M. In some embodiments, to limit the number of conversations to only relevant conversations, a filter (e.g., conversation filter 607) may be used to remove unwanted conversations such as broadcast or multicast conversations. For example, broadcast conversations may be those that have one IP address that have the last fields equal to 255. Additionally, multicast conversations may be those that have an IP address that are within the range of 244.0.0.0 to 239.255.255.255. These conversations may not have much value for the detection of the service. Additionally, conversations that have low values to contribute to the determination of the service type may also be filtered. For example, the conversations that are filtered out may represent conversations that have low throughput.

Some embodiments can include various techniques to filter out low value conversations. In some embodiments, the conversation filter can be designed such as the top k conversations in the traffic map can be chosen to pass to the input processor. In some embodiments, a criteria to pick the top k can be the total number of packets or the total size of the data chunk computed by the sum of the size of all the packets.

FIG. 7 illustrates filtering conversations to a top k conversations using packet count as the criteria in accordance with an embodiment. In some embodiments, a packet size may be used to filter conversations. In particular, FIG. 7 illustrates traffic map 701 that includes a set of conversions with packet counts, illustrated as Convo A, 40 pkts; Convo J, 100 pkts; Convo M, 5 pkts; Convo F, 150 pkts; and Convo D, 10 pkts. The traffic map 701 can be sorted to generate sorted traffic map 703, that includes a set of conversions and packet counts, including Convo F, 150 pkts; Convo J, 100 pkts, Convo A, 40 pkts; Convo D, 10 pkts, and Convo M, 5 pkts. The traffic map can be filtered to get the top k=3 conversations to generate the Top k traffic map 705, which include the set of conversions and packets counts, as illustrated Convo F, 150 pkts; Convo J, 100 pkts, and Convo A, 40 pkts.

In some embodiments, a traffic filter can be designed using a threshold which may be empirically determined by conducting experiments to limit the number of conversations to only essential conversations valuable for the determination of the service types. The criteria can be the packet count, as illustrated in FIG. 8 in accordance with an embodiment or the packet size.

FIG. 8 illustrates filtering conversations with a threshold using packet count as a criteria in accordance with an embodiment. As illustrated, the traffic map 801 includes Convo A, 40 pkts; Convo J, 100 pkts; Convo M, 5 pkts; Convo F, 150 pkt; and Convo D, 10 pkts. The traffic map 801 may filter out conversations with pkts <=15 to generate filtered traffic map 803, which includes Convo F, 150 pkts; Convo J, 100 pkts; and Convo A, 40 pkts.

In some embodiments, a traffic filter can be designed to use the load size (e.g., sum of packets' sizes) to limit the number of conversations. This may work similarly as using packet counts as the threshold described herein.

FIG. 9 illustrates filtering conversations with a threshold using load size as the criteria in accordance with an embodiment. As illustrated, traffic map 901 can include Convo A, 40 kb; Convo J, 100 kb; Convo M, 5 kb; Convo F, 150 kb; and Convo D, 10 kb. The traffic map 901 can be filtered to remove conversations with threshold <=50 kb to generate filtered traffic map 903 that includes Convo F, 150 kb; and Convo J, 100 kb.

In some embodiments, to optimize the packet tracker's operation thereby reducing resource consumption, a rest duration r may be included between each burst. Accordingly, the packet tracker may not always be on.

Figure 10:
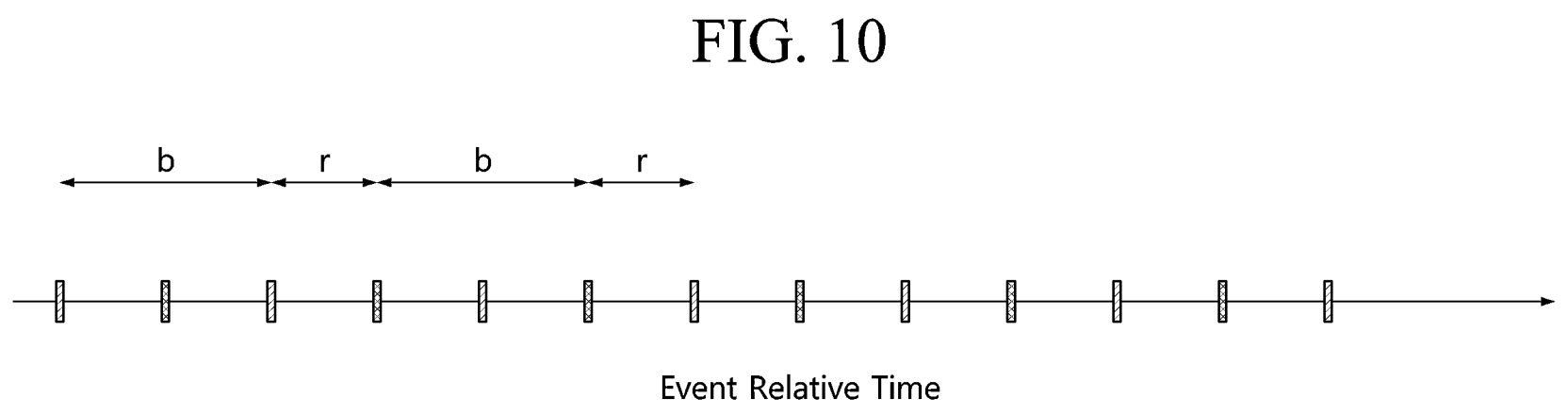

FIG. 10 illustrates filtering conversations with a threshold using load size as the criteria in accordance with an embodiment. In particular, FIG. 10 illustrates an example using 400 ms burst during which the packet tracker is operational (illustrated as duration b) and 100 ms rest during which the packet tracker is not operational (illustrated as duration r).

In some embodiments, an input processor (e.g., input processor 502 of FIG. 5) may be used to receive and organize features extracted from a traffic decomposing module (e.g., traffic decomposer 502 of FIG. 5), and then transform the features into the appropriate form for a service detector (e.g., service detector 506 of FIG. 5). In some embodiments, there may be two main components in the input processor, including a cache manager and the least recently used (LRU) cache.

Figure 11:
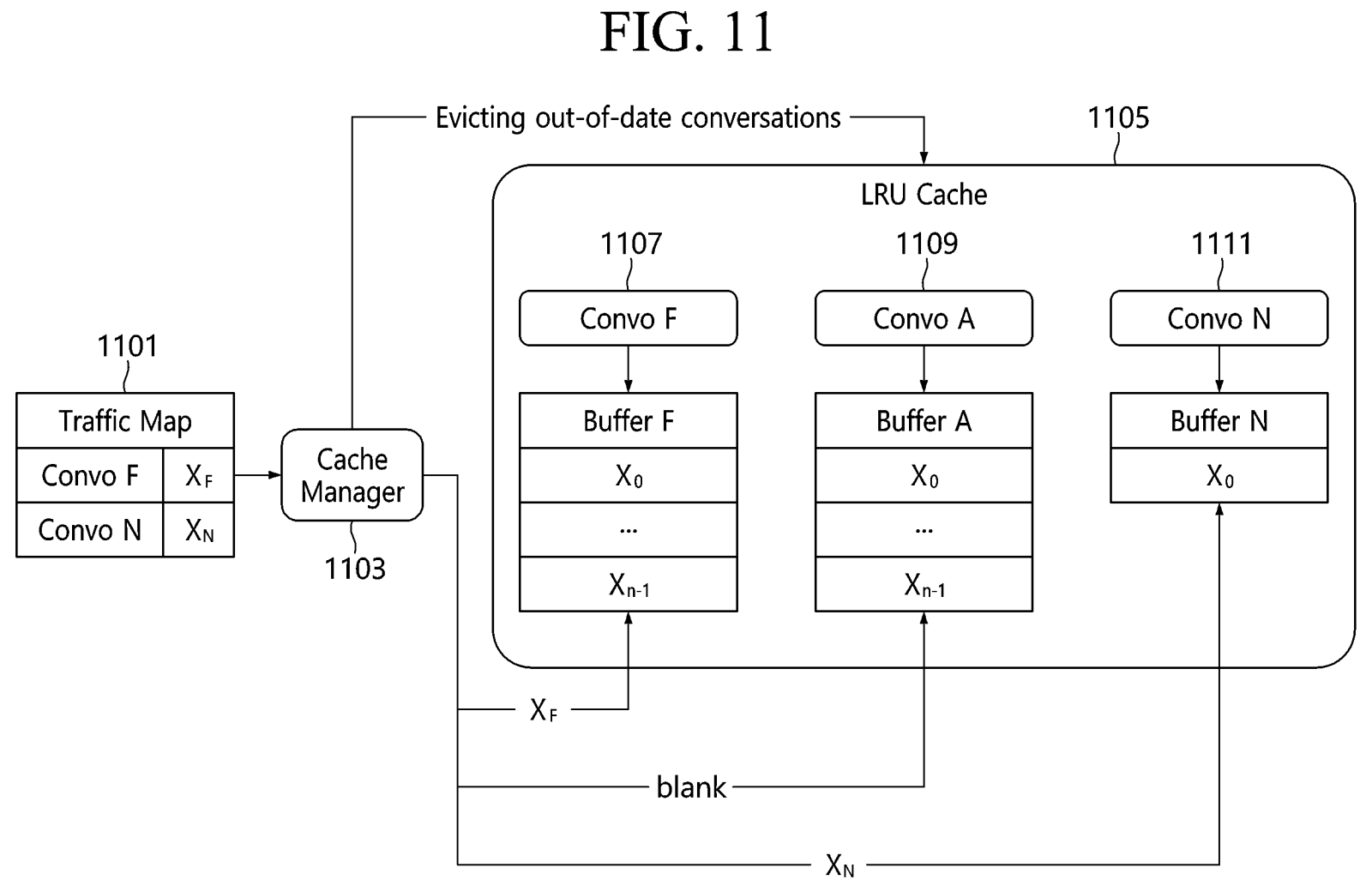

FIG. 11 illustrates a cache manager and a LRU cache in accordance with an embodiment. The cache manager 1103 may manage the content of the LRU cache 1105 while the LRU cache 1105 may be in charge of housing the final input that may be fed into an ML-based network service detector module. In some embodiments, the LRU cache 1105 may be an ordered hash map with a capacity. Each entry in the LRU cache may have a key which is the conversation and may be linked to the value which is a first-in-first-out buffer that holds the features for each time-steps. A buffer may have a capacity of n and the default value may be a particular value (e.g., default value is n=6). The LRU cache may aggregate the data for the correspondent conversation that it's holding. When there is data for a conversation, the cache manager 1103 may route the data to the corresponding buffer in the cache. If an entry associated with a conversation is currently in the cache and there is not data coming in for it in the traffic map, then the cache manager 1103 may insert a blank set of features to its buffer. If the number of blank feature set in a buffer reaches the capacity of the buffer, then the cache manager 1103 may signal the LRU cache 1105 so that it can evict that entry.

As illustrated in FIG. 11, the LRU is currently housing 3 conversations, including conversation F 1107, conversation A 1109 and conversation N 1111 and each conversation has a corresponding buffer. The traffic map may include only data for conversation F and conversation N. Conversation F and conversation N's buffers may be updated with the corresponding data while conversation A is updated with a blank feature set. The cache manager 1103 may be in charge of updating these conversations as well as evicting conversation that are too old.

As illustrated, the traffic map 1101 can include Convo F, $X_F$; and Convo N, $X_N$, which can be provided to the cache manager 1103. The cache manager 1103 can provide the traffic map to the LRU cache 1105, as illustrated $X_F$ can be provided to Buffer F of Convo F 1107, blank data can be provided to Buffer A of Convo A 1109, and $X_N$ may be provided to Buffer N of Convo N 1111. Accordingly, as illustrated, Convo F 1107 can include Buffer F that includes $X_0$ to $X_{n-1}$, Convo A 1109 can include Buffer A that includes $X_0$ to $X_{n-1}$ and Convo N 1101 can include Buffer N that includes $X_0$.

In some embodiments, the cache manager 1103 of the LRU cache 1105 may have the ability to reorder its entries based on how recently it's used. The most recently accessed entry may be at the head and the least recently access entry may be in the tail. In the case that the LRU cache has reached its limit and there is a new entry to add to the cache, its least recently accessed entry may be evicted out to get space for the new entry.

Figure 12:
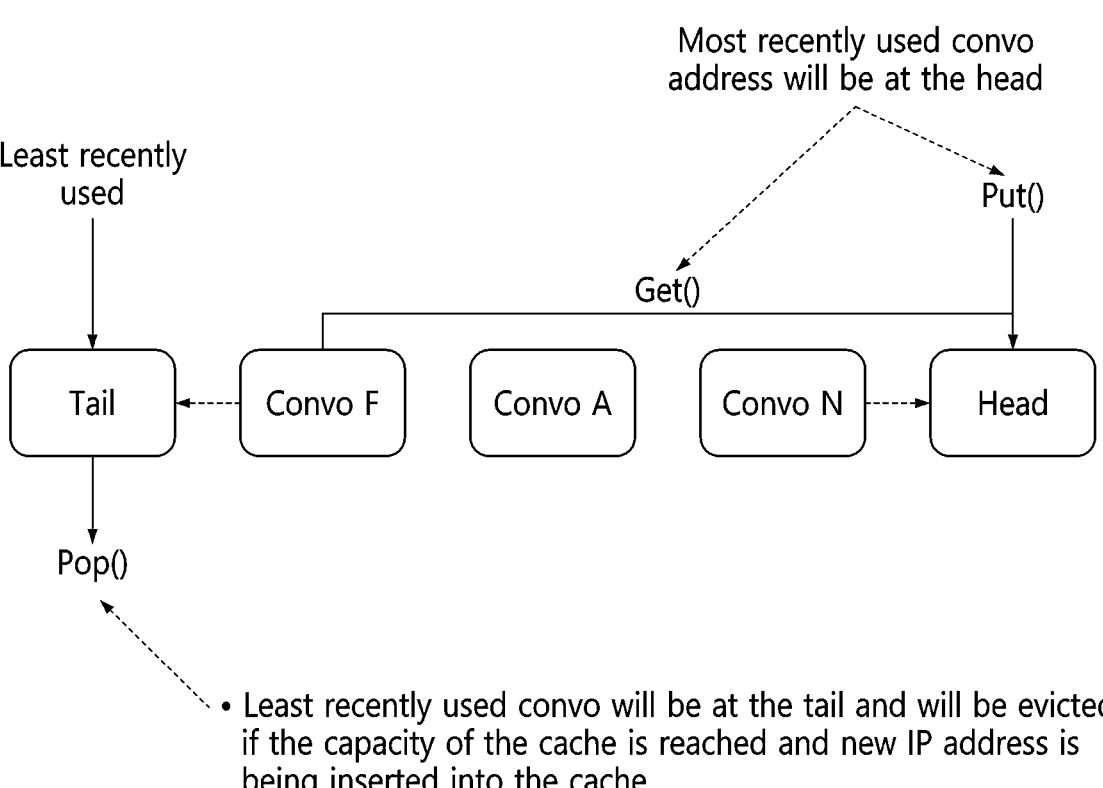
FIG. 12 illustrates update operations of an LRU cache in accordance with an embodiment.

FIG. 12 illustrates update operations of an LRU cache in accordance with an embodiment. As illustrated, the most recently used conversation address may be at the head and the least recently used may be at the tail. The least recently used conversation may be at the tail and may be evicted if the capacity of the cache is reached and a new IP address is being inserted into the cache. As illustrated, the cache includes, from most recent to least recent, Convo N, Convo A, and Convo F. The put( ) operation may be used to insert a conversation and the pop( ) operation may be used to remove a conversation from the cache.

In some embodiments, the input to the ML model of each conversation may be its buffer in the LRU cache. In some embodiments, the process to form the input for each conversation can be thought of as a sliding window of size w (e.g., default is 6) over the features' series of that conversation. At time t, the input $X_t$ may include a combination of multiple feature vectors $[x_{t-w+1}, \ldots, X_t]$. For example, a sequence of 3 seconds (3000 milliseconds) may be used, that mean the total number of time steps for each input is $$\frac{3000\,\text{ms}}{500\,\text{ms}} = 6.$$

This also means that the buffer size is 6. Therefore, the input at time t, $X_t$ will be the following feature vectors $[x_{t-5}, x_{t-4}, x_{t-3}, x_{t-2}, x_{t-1}, x_t]$.

Figure 13:
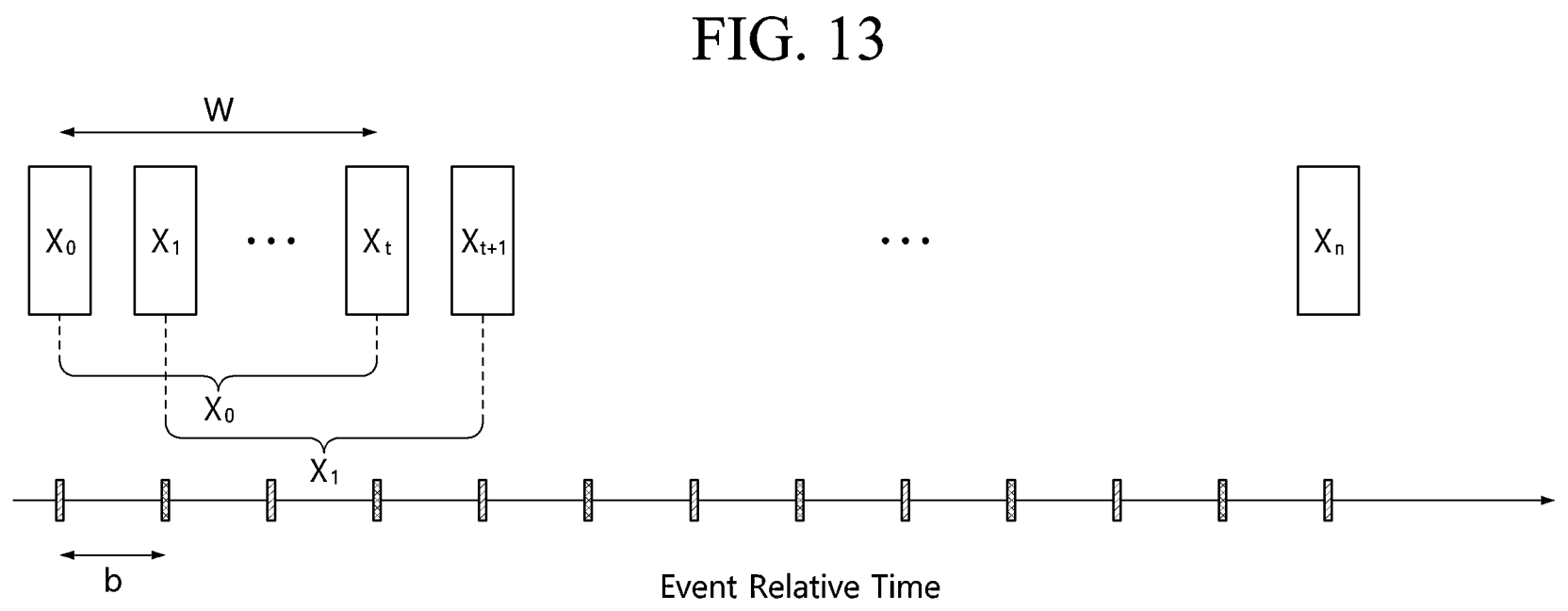

FIG. 13 illustrates a process of forming a final input for a service detector module in accordance with an embodiment. As illustrated, an input at time $X_0$ may be feature vector $[X_0$ to $X_t]$ and at time $X_1$ may be feature vector $[X_1$ to $X_{t+1}]$.

In some embodiments, defining the service type may be an essential step to ensure the performance of the ML-based service detector module. In some embodiments, traffic and or an application in a same service may need to have similar requirements (e.g., latency requirements among others) so that the classification may be meaningful. In certain embodiments, the traffic and/or applications assigned to the same service type may need to have a clear common signature, so that the detection accuracy could be high enough.

In some embodiments, two main services types may be defined including a real-time (RT) service, and a non-real-time (NRT) service, among others. In some embodiments, the number of service types may be designed to be more than two.

In some embodiments, applications such as cloud gaming (e.g., Xbox Game Pass among others) voice of IP (VOIP) (e.g., WhatsApp, Zoom, Viber, among others), and high interaction mobile games (e.g., PUBG, among others), among other applications may fall in the RT category. In particular, these applications generally may have high and consistent downlink activities as well as high interactions between uplink and downlink. The NRT category may include services that may not require real-time interaction. Examples of these are video-streaming such as Netflix, Disney+, audio streaming such as Pandora and Spotify, web-browsing, file-transferring, among others.

In some embodiments, if an ML-based service detector includes more than one layer, finer service types within the service type categories of the previous layers may be defined. For example, the real-time service types can be further divided into sub-service types such as cloud-gaming, audio-call service, mobile-gaming service, and video-call service, among others, corresponding to different levels of latency requirements. As another example, the non-real-time category can be further divided into file-transferring, video-streaming, among other sub-categories, corresponding to different levels of latency requirements.

In some embodiments, a service detector (SD) module (e.g. service detector 506 of FIG. 5) may receive inputs from an input processor, specifically the LRU Cache of the input processor, to generate service prediction. Entries from the cache which pass the buffer size check (e.g., all entries with their buffers size that reach the capacity) may be provided to the SD. If there are m entries that pass the buffer-size check then there will be m corresponding predictions.

FIG. 14 illustrates operation of a service detector in accordance with an embodiment. As illustrated, Conversation A 1403 is detected as a traffic stream that has real-time (RT) service and Conversation D 1405 is detected as a traffic stream that has non-real-time (NRT) service. The LRU cache 1401 may obtain a prediction request and fetch cache content from the set of conversations, including convo A 1403, Convo D 1405 and Convo N 1409. Convo A 1403 can include Buffer A that includes $X_0$ to $X_{n-1}$, Convo D 1405 can include Buffer A that includes $X_0$ to $X_{n-1}$ and Convo N 1409 can include Queue Buffer N with $X_0$. The cache content can be provided to a buffer size check 1415 such that only entries that host Convo A and Convo D may pass and are provided to service detector 1413, which can generate a prediction map 1411 that includes a table with ID and prediction as follows: Convo A, 0 (RT) and Convo D, 1 (NRT).

In some embodiments, it may be possible to design the SD to have only one classifier (e.g., only a coarse-grained classifier) or multiple layers of classifiers (e.g., a coarse-grained classifier and one or more fine-grained classifiers). In some embodiments, in the case of multi-layers, there may be coarse grain and fine grain layers. A purpose may be to maximize the gain from the classifiers. Specifically, given an example of a service detector that has two layers. The first layer (e.g., the coarse-grained classifier) may be to achieve a rough range of the requirements with strong signature e.g. the network traffic belongs to each of the service types in layer 1 should have highly distinguishable characteristics from each other. For example, in the RT service type, uplink and downlink traffic should have more activities compared to traffic that is from the NRT service type. From then, the second layer (e.g., the fine-grained classifiers) which may include multiple sub-classifiers may perform fine grain classifying on the results from the first layer. The service types in the layer 2 should have less obvious traffic characteristics that can be used to distinguish from one category to another. The goal may be to achieve a finer range of requirement if possible.

Figure 15:
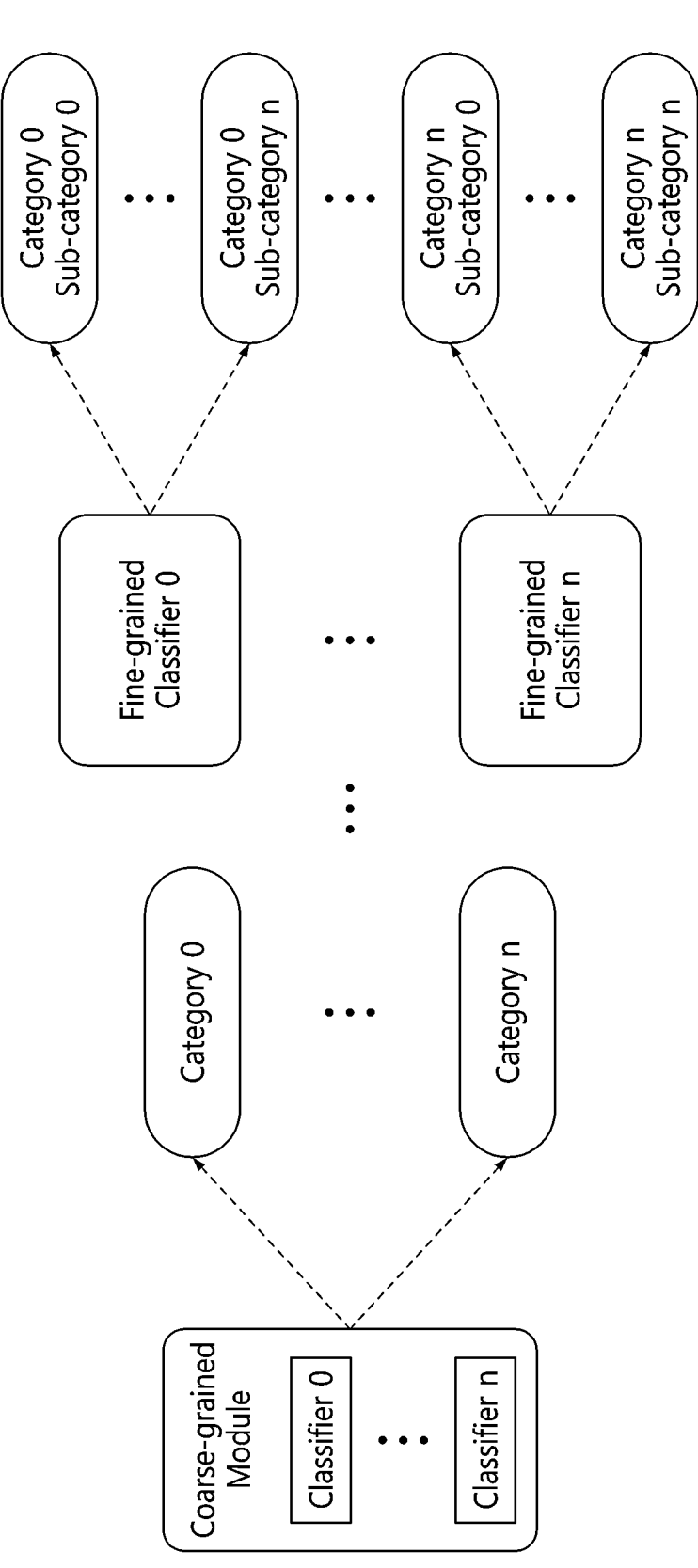
FIG. 15 illustrates a pipeline of a multi-layer network service classification module in accordance with an embodiment.

FIG. 15 illustrates a pipeline of a multi-layer network service classification module in accordance with an embodiment. As illustrated, the pipeline includes coarse-grained module that includes classifiers 0 to n, which can be associated with categories 0 to n. The pipeline may include fine-grained classifiers 0 to n, which can each generate further category and corresponding sub-categories, including category 0, sub-category 0 to category n, sub-category n.

In some embodiments, in addition to the first layer (L1), a second layer (L2) of the ML-based service detector module may be implemented where the RT service category and the NRT service category may be further divided into sub-service categories to be detected. In some embodiments, the L1 prediction results may be stored in a list (e.g., L1 Pred List). Next, this list may be fed into the L1 post-processor to stabilize the service prediction of each conversation. The output of the L1 post-processor may be a map (e.g., L1 Category Map) where each entry in the map may include the service category as the key and a list of conversations that belong to that category as the value. From the L1 Category Map, the list of conversations that belong to each category can be retrieved along with the traffic input from the LRU Cache. These inputs may be fed into the L2 Service Detection module where the RT & NRT classifiers are located. Next, these classifier models may make the sub-services prediction. The sub-service prediction outputs from the L2 Service Detector module may then be passed to their corresponding L2 post processor (RT or NRT). The L2 post processors may be implemented similar to the L1 post processor.

Figure 16:
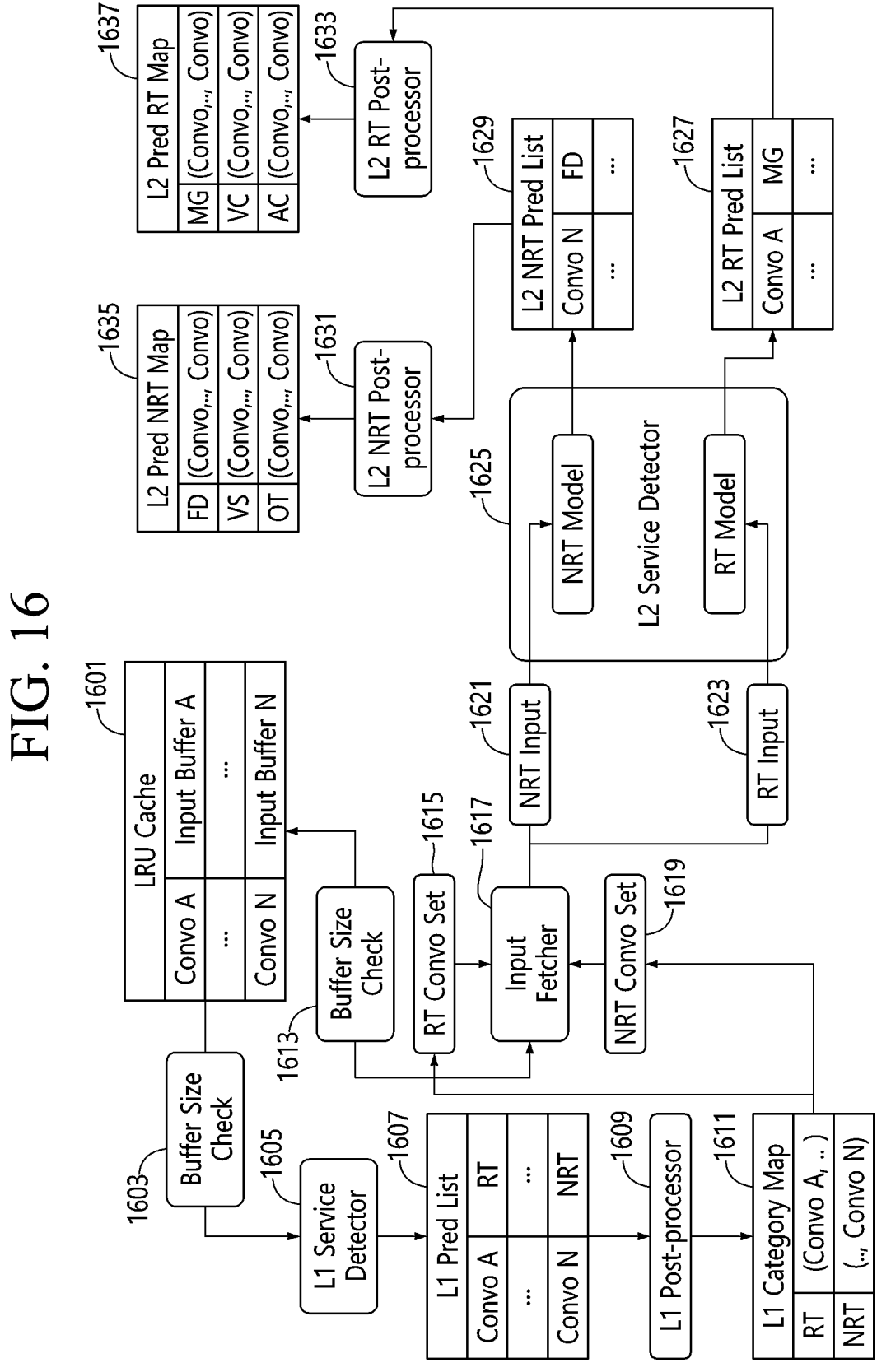
FIG. 16 illustrates a flow diagram of a service detector module that includes two layers, a coarse-grained layer (L1) and a fine-grained layer (L2) in accordance with an embodiment.

FIG. 16 illustrates a flow diagram of a service detector module that includes two layers, a coarse-grained layer (L1) and a fine-grained layer (L2) in accordance with an embodiment. As illustrates, an LRU Cache 1601 may be provided to a buffer size check 1603 which can provide an output to an L1 service detector 1605. The L1 service detector 1605 can generate an L1 predication list 1607 which can be provided to an L1 post-processor 1609, which may generate an L1 category map 1611. The L1 category map 1611 can be used to generate an NRT conversation set 1619 and an RT conversation set 1615, which can be provided to an input fetcher 1617. The LRU cache 1601 may also be provided to a buffer size check 1613 which can provide an output to the input fetcher 1617. The input fetcher 1617 can provide an NRT input 1621 to an NRT model of the L2 service detector 1625 and an RT input 1623 to an RT model of the L2 service detector 1625. The NRT model of the L2 service detector 1625 can generate an L2 NRT prediction list 1629 and the RT model of the L2 service detector 1625 an generate an L2 RT prediction list 1627. The L2 NRT prediction list 1629 can be provided to an L2 NRT post-processor 1631 which can generate an L2 predication NRT map 1635. The L2 RT predication list can be provided to an L2 RT post-processor 1633 which can generate an L2 predication RT map 1637.

In some embodiments, the classifiers of the layers (e.g., layer 1, layer 2, among others) of the ML-based service detector module can be implemented using different machine learning techniques. Network traffic flow of the services can be collected for the purpose of training and testing the classifiers. In some embodiments, tree-based methods such as random forest or gradient boosted trees can be used to implement one or more layers of the ML-based service detector module. In some embodiments, Recurrent Neural Network (RNN) can be used to implement one or more layers of the ML-based service detector module. The core of the RNN can be a Long Short-Term Memory (LSTM) Unit or a Gated Recurrent Unit (GRU). In some embodiments, a convolutional neural network (CNN) may be used.

In some embodiments, to identify the RT and NRT categories, a heuristic-based approach may be introduced for the L1 coarse grain classifier. The Logical Gate Unit may have two sequential stacks which may be connected one after another. The first stack may be NRT detection and the second stack may be the RT detection. The main information that the Logical Gate Unit may use is the Uplink (UL) & Downlink (DL) Packet Size information. In some embodiments, at first, the average packet size for UL and DL may be passed to the NRT Detection if the UL passes a threshold (e.g., 50 bytes) and the DL passes a threshold (e.g., 50 bytes), then it may be passed to the next stack. If the average packet size for UL passes a threshold (e.g., 100 bytes) and the DL may need to pass a threshold (e.g., 200 bytes), then it may be passed to the final stack. If the average packet size for the UL and the DL do not pass the various thresholds, then the traffic may be classified RT service. If the DL packet size passes a threshold (e.g., 1000 bytes) then it is classified as RT service, if not it is classified as NRT.

Figure 17:
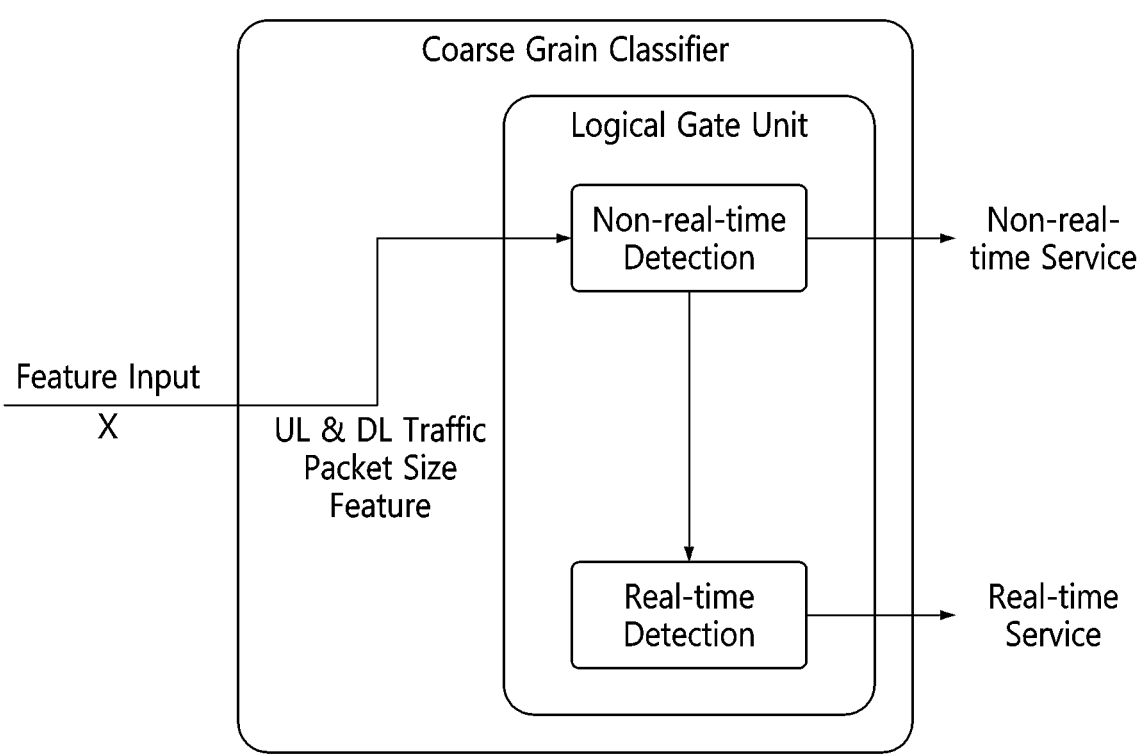
FIG. 17 illustrates a heuristic based approach for L1 coarse grain service detection in accordance with an embodiment.

FIG. 17 illustrates a heuristic based approach for L1 coarse grain service detection in accordance with an embodiment. As illustrated, the coarse grain classifier module includes a logical gate unit that includes a non-real-time detection module and a real-time detection module. The non-real-time detection module may receive a feature input X (e.g., UL & DL traffic packet size feature) and may generate a non-real-time service. The feature may be provided to the real-time detection module which may generate a real-time service.

In some embodiments, to identify the RT conversation/traffic, a heuristic-based approach that may use port numbers associated with real-time applications can be implemented. Specifically, conversation/traffic that utilize the following ports described below are likely to be RT.

TCP/UDP port 80: this is the standard HTTP port and is often used for web-based services, including real-time web applications.

TCP/UDP port 443: The standard HTTPS port is used for secure communication, including real-time messaging and data exchange.

UDP port range 5000-5500: This range is commonly used for various real-time applications, including video conferencing and VOIP services.

UDP port 16384-32767: This range is commonly used for Real-time Transport Protocol (RTP) and Secure RTP (SRTP) for multimedia streaming and conferencing applications.

UDP port 19302-19309: These ports are associated with WebRTC, a technology used for real-time audio and video communication in web applications.

TCP/UDP port 8080: This is a commonly used alternative HTTP port and could be utilized by real-time mobile apps.

In some embodiments, other traffic/conversation that don't use the above ports should be NRT.

In some embodiments, to optimize the operation of the SD and reduce resource consumption, once a confidence detection result is obtained for a conversation, the detection can be skipped for that conversation until the port or service is stopped, since most applications may use the setup port till the end of service.

In some embodiments, a post processor (e.g., post processor 408 of FIG. 4) may be used manage and store the most recent n past multi-label predictions (e.g., n may be empirically determined to work with the specific application but the default value is e.g., 5) produced by the SD and use this information to generate a decision accordingly. The post processor may be designed to function as a voting system and it may have n buffer slots (e.g., in a FIFO buffer) corresponding to n time steps from the current time step to the n time step in the past. In some embodiments, since a system can detect multiple services, the post processors can also store multi-label predictions.

Figure 18:
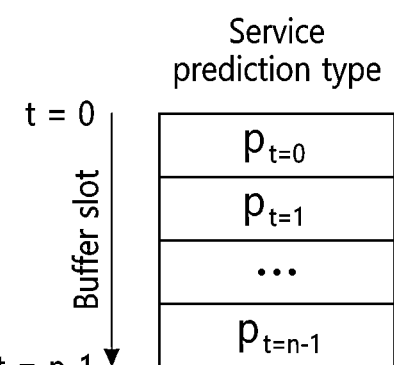
FIG. 18 illustrates a buffer in the form of a table in accordance with an embodiment.

FIG. 18 illustrates a buffer in the form of a table in accordance with an embodiment. As illustrated, n is the size of buffer. Since the buffer is designed as a FIFO, buffer slot t=0 may have the most recent prediction. The decision whether each service type present in the signal may be determined by applying a pre-processing scheme.

In some embodiments, the post processor may be designed to perform a majority voting decision to adopt the class labels which are voted for the most to be the final decision.

Figure 19:
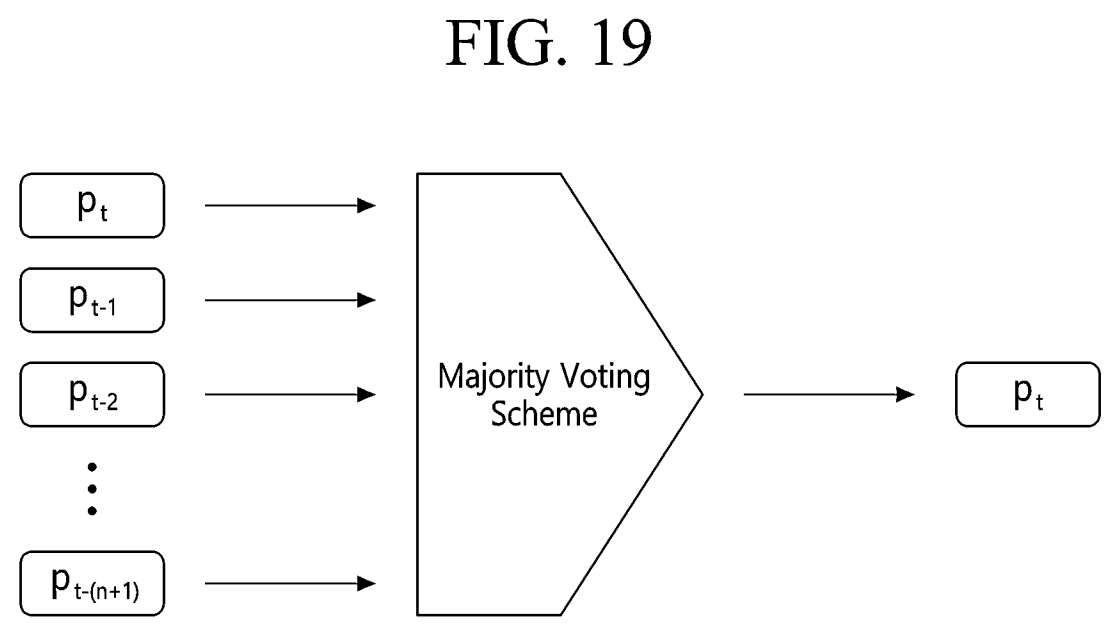

FIG. 19 illustrates a post processor implemented using a majority voting scheme in accordance with an embodiment. A decision may be generated by adopting the most voted class label. As illustrated, a majority voting scheme module may receive inputs $p_t$, $p_{t-1}$, $p_{t-2}$, through $p_{t-(n+1)}$ and can generate an output $P_t$.

In some embodiments, the post processor may be designed to perform a weighted voting scheme. Unlike the majority voting scheme described herein, this voting scheme may give a voting power to each vote/raw prediction. The most recent raw prediction may be given the most voting power up and the following raw predictions at the previous time steps may decay at a rate determined by the hyperparameter $\alpha$ (e.g., default value is 0.1). Raw predictions from the farther past may have less voting power compare to the most recent ones.

Figure 20:
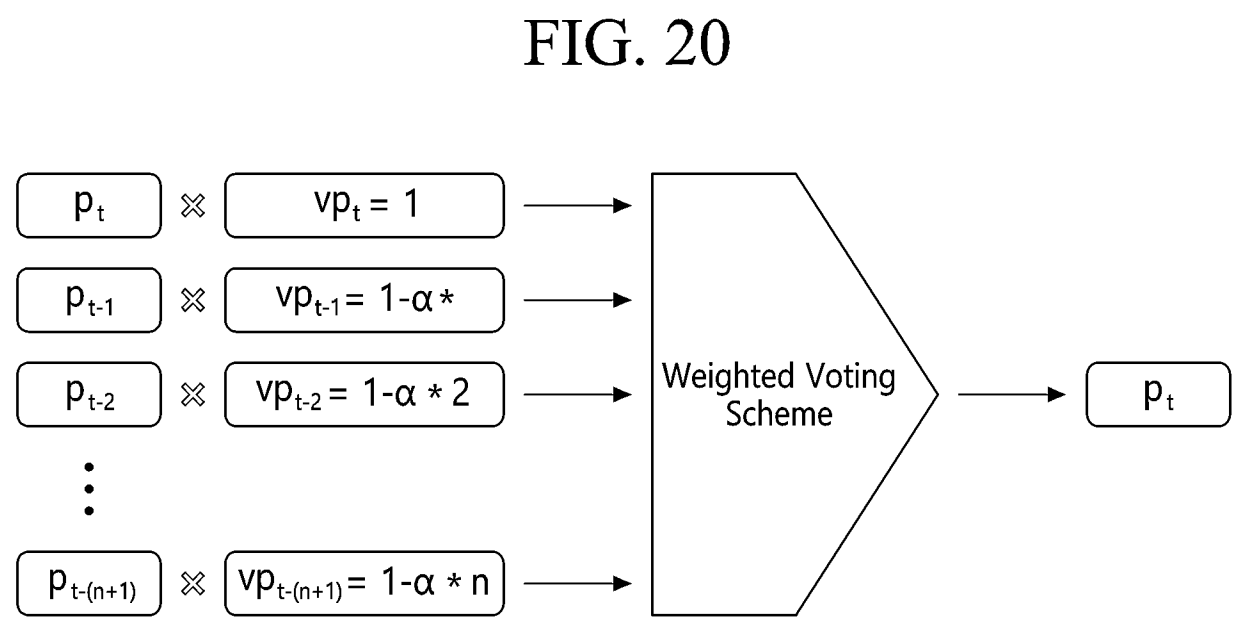

FIG. 20 illustrates a post processor implemented using a weighted voting scheme in accordance with an embodiment. In particular, an input, illustrated as $p_t$, $p_{t-1}$, $p_{t-2}$, through $p_{t-(n+1)}$, may be multiplied by a voting power vp, illustrated as $vp_t=1$, $vp_{t-1}=1-\alpha^*$; $vp_{t-2}=1-\alpha^*2$ through $vp_{t-(n+1)}=1-\alpha^*n$. The output can be Pt.

In some embodiments, bias voting can be used to implement the post processor.

Figure 21:
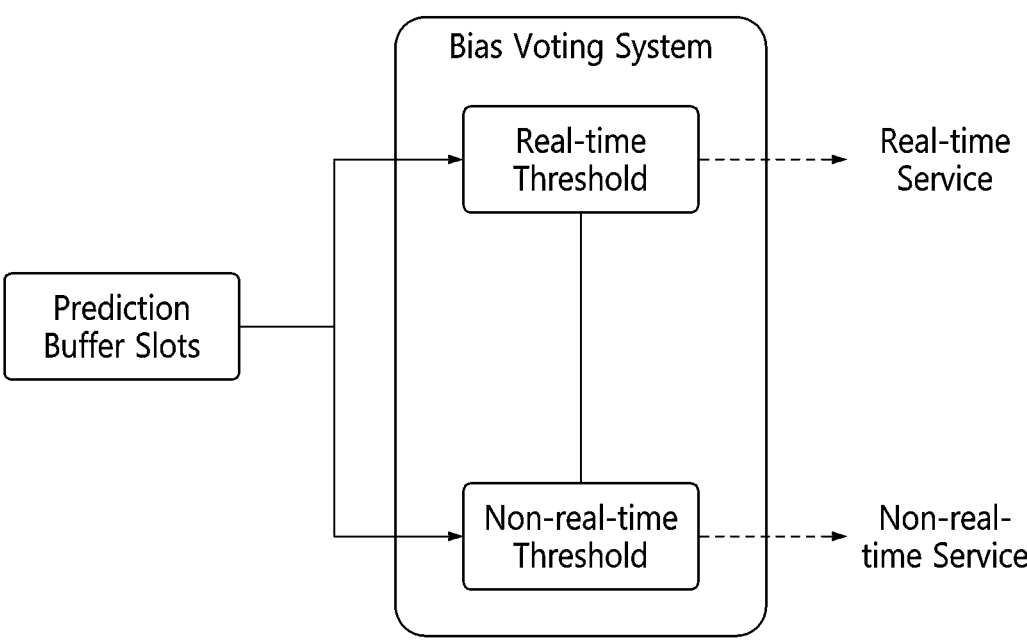
FIG. 21 illustrates a post processor implemented using a bias voting scheme in accordance with an embodiment.

FIG. 21 illustrates a post processor implemented using a bias voting scheme in accordance with an embodiment. There may be multiple threshold filters corresponding to the number of the defined services (e.g., 2 threshold filters for RT & NRT services, as in the example of FIG. 21). If the number of detections for a service type in the n buffer slots pass the threshold, then that service may be predicted to present in the signal.

Accordingly, in some embodiments, first a packet may be tracked and grouped according to the quintuple rules within a time interval (e.g., 500 milliseconds) using a hash map. The conversations in the traffic map may then be filtered out by a traffic filter. A cache manager may use entries in the traffic map to update the LRU cache. When there is a request, the content of the LRU Cache may be fetched and passed to the buffer size check. Whatever input buffers that pass the buffer check may be fed into a service detector. The output of the service detector may go through a post-processor to produce the final predictions which may be the service map. Finally, the service map may be fed to the prioritization module to perform the prioritization.

Figure 22:
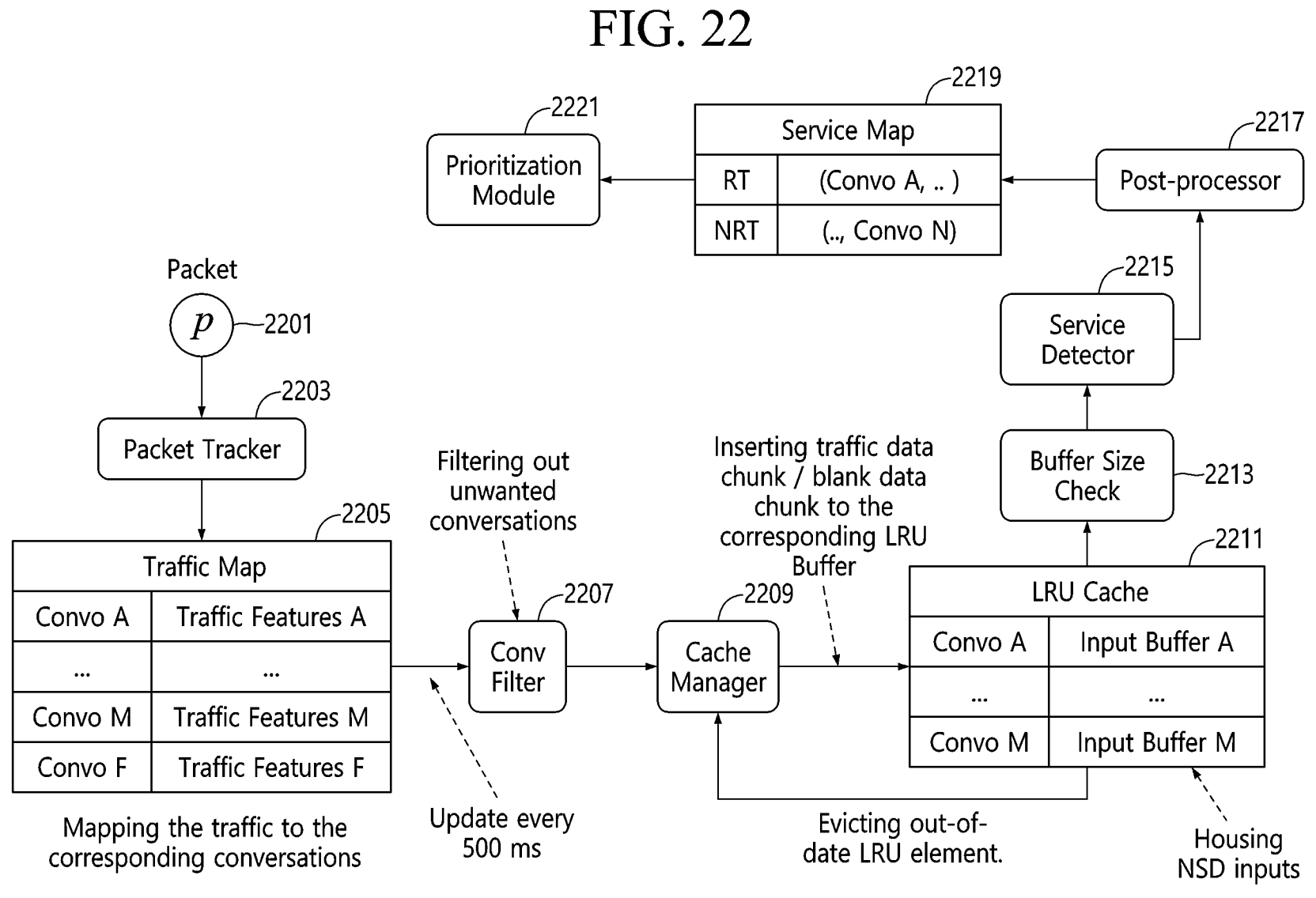

FIG. 22 illustrates a data flow of a network service detector in accordance with an embodiment. As illustrated, a packet 2201 can be provided to a packet tracker 2203, which can generate a traffic map 2205. The traffic map 2205 can be provided to a conversation filter 2207 to filter out unwanted conversations, which can be provided to a cache manager 2209. The cache manager 2209 can insert traffic data chunk or blank data chunk to a corresponding LRU buffer in the LRU cache 2211, which may evict out of data LRU elements. The LRU cache 2211 may be provided to a buffer size check module 2213 which can provide an output as in input to a service detector module 2215, which can provide an output as an input to a post-processor module 2217. The post-processor module 2217 may generate a service map 2219 which can be provided to a traffic prioritization module (TPM) 2221. In some embodiments, there may be two (or more) phases that can happen in the TPM. First, the TPM may receive an input from the post-processor and use this information to decide whether or not a prioritization is needed. After that, if prioritization is required, then the TPM may decide what conversations should be prioritized.

Figure 23:
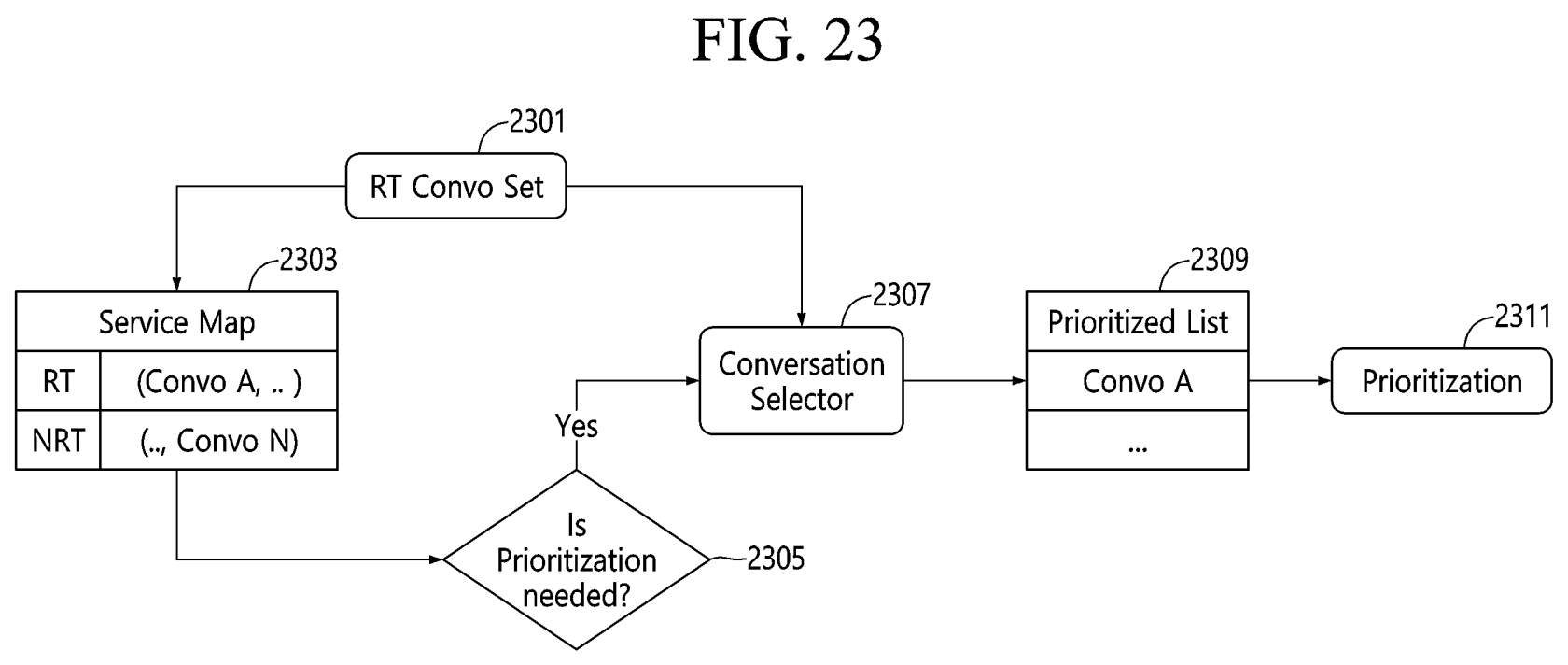

FIG. 23 illustrates a flow diagram of a prioritization module in accordance with an embodiment. The criteria to decide whether prioritization is needed is described as follow. If there are RT links and NRT links then the RT links may be prioritized. If all the links are either RT or NRT then no prioritization may be needed. In the case that all the links are RT and there is more than one layer of the Service Detector (provide finer level of detection), the links that have higher latency requirement should be prioritized (e.g., Mobile-gaming link should be prioritized over Video-call & Audio-call links, among various other examples). In some embodiments, the prioritization may be applied to links that are on the same client and/or different clients. As illustrated in FIG. 23, the service map 2303 can include RT conversations and NRT conversations. If prioritization is needed in 2305, the conversation selector module 2307 may select the RT conversation set 2301 and generate the prioritize list 2309 that includes the RT conversations (e.g., Convo A, among others), which can be provided to the prioritization module 2311. In some embodiments, the system may use various techniques to prioritize the traffic links including the techniques described below.

In some embodiments, a Quality of Service (QOS) configuration may be used to prioritize traffic links. In some embodiments, by setting up QoS rules, specific types of traffic may be designated as high-priority, ensuring that they receive preferential treatment in terms of bandwidth, latency, and other factors.

In some embodiments, traffic shaping may be used to prioritize traffic. In some embodiments, traffic shaping may regulate the flow of packets to guarantee a certain level of performance. Traffic shaping may smooth out the traffic flow and prevent high-priority traffic from being crowded out by bulk data transfers.

In some embodiments, bandwidth reservation may be used to prioritize traffic. In particular, some embodiments may reserve a specific amount of bandwidth for prioritized traffic which may ensure that critical applications always have the resources they need.

In some embodiments, packet scheduling techniques may be used to prioritize traffic. In some embodiments, techniques like Class-Based Weighted Fair Queuing (CBWFQ) may allow for the allocation of bandwidth based on the class or priority of the traffic. High-priority traffic may be placed in a queue with more resources.

In some embodiments, rate limiting for non-prioritized traffic may be used to prioritize traffic. In particular, by setting limits on non-essential traffic, network administrators can ensure that more bandwidth is available for prioritized applications.

In some embodiments, policy-based routing (PBR) may be used to prioritize traffic. In particular, with PBR, network administrators can define specific paths for different types of traffic. High-priority traffic can be routed along paths that offer better performance.

In some embodiments, load balancing may be used to prioritize traffic. In particular, this may include distributing network traffic across several servers or paths, ensuring that no single point becomes a bottleneck. In some embodiments, load balancing may be used to ensure that high-priority traffic always has a clear path.

Described here are data collection procedures for training and testing an ML-based service detector in accordance with an embodiment. In some embodiments, in order to train and test a ML model to predict the type of service, traffic data may have to be decomposed and mapped to the right application. Described below are series of steps to decompose and map traffic data.

In some embodiments, for each client connected to the host, the process may capture the list of running applications/packages that generate network traffic. In some embodiments, the process may get the Process IDs (PIDs) of these applications/packages. In some embodiments, the process may utilize network analyzer tools to track network system calls/active connections for each PID then extract the server IP addresses. In some embodiments, the process may use the information from the traffic log and cross reference with the server IP addresses collected from the network analyzing tool to identify which data comes from which applications/packages.

Figure 24:
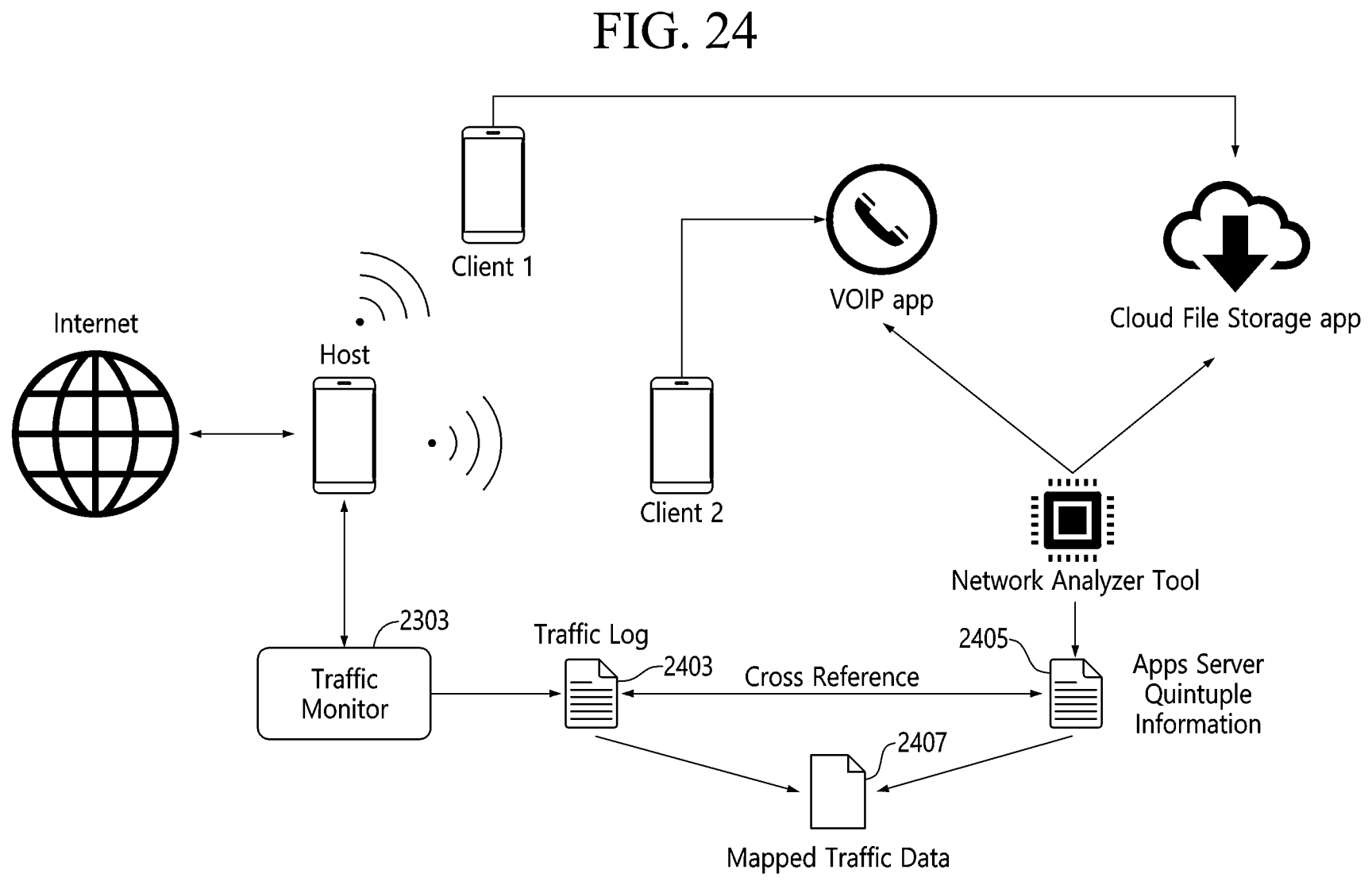

FIG. 24 illustrates a flow of a data collection process in accordance with an embodiment. In this example, two clients, client 2 is running a VOIP app (Real-time) and client 1 is running a video streaming app (non-real-time). The host may include a traffic monitor 2401 that can generate a traffic log 2403. A network analyzer tool may monitor the VOIP app and the video streaming app and generate an apps server quintuple information 2405, which can be cross referenced with the traffic log 2403, to generate a mapped traffic data 2407.

Figure 25:
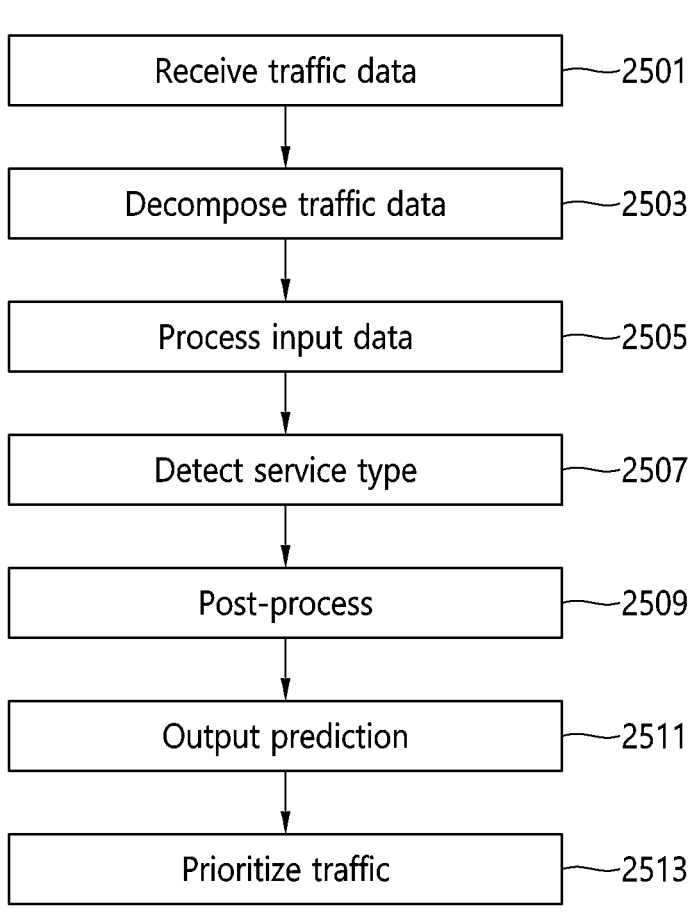
FIG. 25 shows an example of a high-level flow diagram depicting a process 2500 for network service detection (or NSD), in accordance with some embodiments.

FIG. 25 shows an example of a high-level flow diagram depicting a process 2500 for network service detection (or NSD), in accordance with some embodiments. In some embodiments, to detect the type of network services in a traffic stream, the process 2500 may group together applications that have similar latency requirement and traffic and data characteristics to form a service type (such as video call, audio call, etc.). These service types may be predefined. The process 2500 may then use machine learning algorithms to detect the traffic pattern in the traffic stream, for example, by using features extracted from packet information and optionally additional sensor information. Subsequently, the output of the machine learning algorithm may go through a post-processing process that may employ different techniques to use current prediction and past predictions to make a final decision about the network service type. The post-processing process may be a logic-based post-processing process that may use a current prediction and past predictions.

In operation 2501, the user device may receive network traffic data stream.

In operation 2503, the network traffic stream may be decomposed to produce multiple, smaller traffic flows. In some embodiments, the process 2500 may track the packets (e.g., by a packet tracker module or unit) in the stream then group them, for example, according to the quintuple rules (e.g., source IP address, source port, destination IP address, destination port, and transport layer protocol), thus segmenting the stream into individual traffic flows. The individual traffic flows may be referred to as conversations. It should be noted that the decomposition process may be performed without interaction with or assistance from the final destination of the packets (e.g., an application).

In operation 2505, the process 2500 may include a pipeline with a caching mechanism that manages and maintains data for all active decomposed traffic flows.

In some embodiments, the process 2500 may extract features from the traffic flows. The features may include, for example, packet information (e.g., packet count, Transmission Control Protocol (TCP) packet count, User Datagram Protocol (UDP) packet count, average packet size, etc.), and packet timing information (e.g., interval-packet arrival time) in each predetermined observation time window.

For brevity, the observation time window may be referred to herein as observation window, observation time, time window, or window.

In operation 2507, the process 2500 may categorize the service type associated with each conversation. In some embodiments, the process 2500 may employ machine learning (ML) techniques on the network traffic statistics derived from the conversations' traffic flow, to accurately categorize the service type associated with each conversation. The process 2500 may perform a single or a series of machine learning algorithms on the traffic features extracted from the segregated traffic flows, and any additional sensor information.

In operation 2511, the process 1500 may post-process to predict one or more service type(s) presented in the composite traffic stream. In some embodiments, the process 2500 may include rule-base processing to examine and make decision using the instantaneous detected type of the individual component flows, their historical predicted labels.

In operation 2511, the process 2500 may produce the prediction resulted from operation 2511.

In operation 2513, the process 2500 may, if prioritization is needed, adjust the configuration parameters and allocate resources for the proper traffic stream(s). In some embodiments, if there are RT and NRT links, then the RT links are prioritized. If all the links are either RT or NRT, then no prioritization is needed. In some embodiments, if all the links are RT links and there is more than one layer of the service detector, then the links that have higher latency requirements may be prioritized.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

As described herein, any electronic device and/or portion thereof according to any example embodiment may include, be included in, and/or be implemented by one or more processors and/or a combination of processors. A processor is circuitry performing processing.

Processors can include processing circuitry, the processing circuitry may more particularly include, but is not limited to, a Central Processing Unit (CPU), an MPU, a System on Chip (SoC), an Integrated Circuit (IC) an Arithmetic Logic Unit (ALU), a Graphics Processing Unit (GPU), an Application Processor (AP), a Digital Signal Processor (DSP), a microcomputer, a Field Programmable Gate Array (FPGA) and programmable logic unit, a microprocessor, an Application Specific Integrated Circuit (ASIC), a neural Network Processing Unit (NPU), an Electronic Control Unit (ECU), an Image Signal Processor (ISP), and the like. In some example embodiments, the processing circuitry may include: a non-transitory computer readable storage device (e.g., memory) storing a program of instructions, such as a DRAM device; and a processor (e.g., a CPU) configured to execute a program of instructions to implement functions and/or methods performed by all or some of any apparatus, system, module, unit, controller, circuit, architecture, and/or portions thereof according to any example embodiment and/or any portion of any example embodiment. Instructions can be stored in a memory and/or divided among multiple memories.

Different processors can perform different functions and/or portions of functions. For example, a processor 1 can perform functions A and B and a processor 2 can perform a function C, or a processor 1 can perform part of a function A while a processor 2 can perform a remainder of function A, and perform functions B and C. Different processors can be dynamically configured to perform different processes. For example, at a first time, a processor 1 can perform a function A and at a second time, a processor 2 can perform the function A. Processors can be located on different processing circuitry (e.g., client-side processors and server-side processors, device-side processors and cloud-computing processors, among others).

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A network connected device comprising:
a transceiver configured to receive network traffic from a network;
a memory coupled to the transceiver; and
a processor coupled to the memory and the transceiver, the processor configured to:
decompose the network traffic into a plurality of data flows based on source information and destination information;
store the plurality of data flows in a traffic map, each entry of the traffic map includes a data flow identification and traffic information of the data flow in an observation time window, wherein the data flow identification information includes a set of conversations, each conversation is a tuple defined by combining the source information and the destination information, and wherein each conversation is a link between the memory and a host;
determine a service type for each of the data flows using machine learning; and
prioritize a first data flow over a second data flow in the plurality of data flows based on the service type.

2. The network connected device of claim 1, wherein the first data flow is a real-time (RT) data flow and the second data flow is a non-RT (NRT) data flow.

3. The network connected device of claim 1, wherein the processor is further configured to, during a different observation time window, determine that prioritization is not needed based on determining that all data flows in the plurality of data flows have a same service type.

4. The network connected device of claim 1, wherein the processor is further configured to determine quality of service requirements of the plurality of data flows to prioritize the plurality of data flows.

5. The network connected device of claim 1, wherein the processor is further configured to determine latency requirements of the plurality of data flows to prioritize the plurality of data flows.

6. The network connected device of claim 1, wherein the processor is further configured to determine application types associated with the plurality of data flows to prioritize the plurality of data flows.

7. The network connected device of claim 1, wherein the processor is further configured to reserve an amount of bandwidth for the first data flow.

8. The network connected device of claim 1, wherein the source information is a source Internet Protocol (IP) address or a source port, and the destination information is a destination IP address or a destination port.

9. The network connected device of claim 1, wherein the processor is configured to filter the stored data flows based on a number of packets or a number of bytes in each of the stored data flows.

10. The network connected device of claim 1, wherein the processor is configured to use a multi-layer machine learning model having a first layer and a second layer, wherein the first layer of the multi-layer machine learning model determines the service type and the second layer of the multi-layer machine learning model further divides the service type into sub-categories.

11. A method for detecting network service types, the method comprising:
receiving network traffic from a transceiver;
decomposing the network traffic into a plurality of data flows based on source information and destination information;
storing the plurality of data flows in a traffic map in a memory, each entry of the traffic map includes a data flow identification and traffic information of the data flow in an observation time window, wherein the data flow identification information includes a set of conversations, each conversation is a tuple defined by combining the source information and the destination information, and wherein each conversation is a link between the memory and a host;
determining a service type for each of the data flows using machine learning; and
prioritizing a first data flow over a second data flow in the plurality of data flows based on the service type.

12. The method of claim 11, wherein the first data flow is a real-time (RT) data flow and the second data flow is a non-RT (NRT) data flow.

13. The method of claim 11, further comprising, during a different observation time window, determining that prioritization is not needed based on determining that all data flows in the plurality of data flows have a same service type.

14. The method of claim 11, further comprising determining quality of service requirements of the plurality of data flows to prioritize the plurality of data flows.

15. The method of claim 11, further comprising determining latency requirements of the plurality of data flows to prioritize the plurality of data flows.

16. The method of claim 11, further comprising determining application types associated with the plurality of data flows to prioritize the plurality of data flows.

17. The method of claim 11, further comprising reserving an amount of bandwidth for the first data flow.

18. The method of claim 11, wherein the source information is a source Internet Protocol (IP) address or a source port, and the destination information is a destination IP address or a destination port.

19. The method of claim 11, further comprising filtering the stored data flows based on a number of packets or a number of bytes in each of the stored data flows.

20. The method of claim 11, further comprising using a multi-layer machine learning model having a first layer and a second layer, wherein the first layer of the multi-layer machine learning model determines the service type and the second layer of the multi-layer machine learning model further divides the service type into sub-categories.

* * * * *